(12) United States Patent
Abellera et al.

(10) Patent No.: US 10,013,140 B2
(45) Date of Patent: Jul. 3, 2018

(54) METHODS AND APPARATUS FOR PROVIDING UPDATED CONTENT IN A USER INTERFACE

(75) Inventors: Suzanne Abellera, Palo Alto, CA (US);
Li Chen, Cupertino, CA (US); Ankur Aggarwal, Redwood City, CA (US);
Cipson Jose Chiriyankandath, Redwood City, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 422 days.

(21) Appl. No.: 13/634,829

(22) PCT Filed: Feb. 18, 2011

(86) PCT No.: PCT/US2011/025503
§ 371 (c)(1),
(2), (4) Date: Sep. 13, 2012

(87) PCT Pub. No.: WO2012/112164
PCT Pub. Date: Aug. 23, 2012

(65) Prior Publication Data
US 2013/0014006 A1    Jan. 10, 2013

(51) Int. Cl.
*G06F 3/0481* (2013.01)
*G06F 3/0482* (2013.01)
*G06F 9/451* (2018.01)

(52) U.S. Cl.
CPC ........ *G06F 3/04817* (2013.01); *G06F 3/0482* (2013.01); *G06F 9/451* (2018.02)

(58) Field of Classification Search
USPC ........................................ 715/234, 762, 763
See application file for complete search history.

(56) References Cited

U.S. PATENT DOCUMENTS

| | | | |
|---|---|---|---|
| 5,706,454 A * | 1/1998 | MacPhail | 715/822 |
| 6,606,525 B1 * | 8/2003 | Muthuswamy et al. | 700/52 |
| 7,703,013 B1 * | 4/2010 | Bauermeister et al. | 715/255 |
| 8,156,098 B1 * | 4/2012 | Landsman et al. | 707/706 |
| 2008/0126476 A1 * | 5/2008 | Nicholas | G06Q 10/10 709/203 |
| 2009/0080698 A1 * | 3/2009 | Mihara et al. | 382/103 |

(Continued)

FOREIGN PATENT DOCUMENTS

EP    2192474    6/2010

OTHER PUBLICATIONS

Koenig; Customizing WP7 Push Notification Tiles; Aug. 16, 2010; Chriskoenig.net; pp. 1-9.*

(Continued)

*Primary Examiner* — Andrew R Dyer
(74) *Attorney, Agent, or Firm* — Fish & Richardson P.C.

(57) ABSTRACT

Methods and apparatus for providing updated content in a user interface are disclosed. An example method for providing a user interface includes receiving at a portable electronic device an icon configuration file, installing an icon associated with the configuration file in an icon repository on a portable electronic device, displaying the icon with first content in a user interface on the portable electronic device, receiving second content based on the configuration file, and displaying the icon with the second content in the user interface.

23 Claims, 16 Drawing Sheets

(56) References Cited

U.S. PATENT DOCUMENTS

| | | | |
|---|---|---|---|
| 2009/0178006 A1* | 7/2009 | Lemay | G06F 3/04817 715/835 |
| 2009/0319947 A1 | 12/2009 | Wang et al. | |
| 2010/0138295 A1* | 6/2010 | Caron et al. | 705/14.49 |
| 2010/0235726 A1 | 9/2010 | Ording et al. | |

OTHER PUBLICATIONS

Appropriate Use of Alternative Text; Sep. 21, 2006; WebAIM; pp. 1-14.*
"Capture;" Microsoft Computer Dictionary; May 1, 2002; Fifth Edition; p. 104.*
"Default;" Microsoft Computer Dictionary; May 1, 2002; Microsoft Press; Fifth Edition; p. 190.*
Katrien De Graeve; "Creating a Tile using theme's color as background (Windows Phone 7);" Katrien's MSDN Blog; Nov. 1, 2010; Microsoft.com; pp. 1-7.*
"Web browser;" Microsoft Computer Dictionary; May 1, 2002; Microsoft Press; Fifth Edition; p. 708.*
Joe Burns; Reloading the Page; Jan. 4, 2005; htmlgoodies.com; pp. 1-2.*
Meta Refresh; Apr. 15, 2009; quackit.com; pp. 1-2.*
Ilias Tsagkilis; Android Full App, Part 8L Create an AppWidget for the home screen; Dec. 28, 2010; Java Code Geeks; pp. 1-8.*
Mike Ormond; Live Times on a Schedule; Nov. 24, 2010; Mike Ormond's Blog; Microsoft Developer's Network; pp. 1-18.*
Public Class: AppWIdgetProviderInfo; Nov. 14, 2010; Developer. Android.com; pp. 1-5.*
Canadian Intellectual Property Office, "Examiner's Report," issued in connection with Application No. 2,827,466, Aug. 8, 2014, 2 pages.
"Multiple Live Tiles and Access Points?" Forum. Jul. 26, 2010. Retrieved from "http://social.msdn.microsoft.com/Forums/en-US/windowsphone7series/thread/33dldec3" on Nov. 30, 2010, 2010 Microsoft Corporation (2 pages).
"Remote background images for tiles?" Forum. May 13, 2010. Retrieved from "http://social.msdn.microsoft.com/Forums/en-US/windowsphone7series/thread/0372d123" on Nov. 30, 2010, 2010 Microsoft Corporation (1 page).
"Home screen widget content," retrieved from "http://library.forum.nokia.com/topic/Web_Developers_Library/GUID-1116A27E-DA29-4" on Dec. 2, 2010, Nokia 2010 (1 page).
"Optimizing performance and battery life," retrieved from "http://library.forum.nokia.com/topic/Web_Developers_Library/GUID-40782DAD-F6E2-4" on Dec. 2, 2010, Nokia 2010 (2 pages).
"Windows Phone—Live Tiles—How do they work?" Forum. Nov. 5, 2010. Retrieved from "http://channel9.msdn.com/Forums/Coffeehouse/Windows-Phone-Live-Tiles" on Dec. 1, 2010, 2010 Microsoft (3 pages).
International Searching Authority, "International Preliminary Report on Patentability," issued in connection with PCT Application No. PCT/US2011/025503, dated Aug. 21, 2013 (5 pages).
International Searching Authority, "International Search Report", issued in connection with PCT Application No. PCT/US2011/025503, dated Aug. 26, 2011, (5 pages).
International Searching Authority, "Written Opinion", issued in connection with PCT Application No. PCT/US2011/025503, dated Aug. 26, 2011, (5 pages).
Communication Pursuant to Article 94(3) EPC issued in European Application No. 11706120.0 dated Feb. 28, 2017; 6 pages.
Communication Pursuant to Article 94(3) EPC issued in European Application No. 11706120.0 dated Aug. 22, 2017; 7 pages.
4zizpour, "A longterm windows mobile user switching to android - part 5: Htc Sense widgets review," SmartPhoneBlogging, Sep. 30, 2009, [retrieved on Mar. 15, 2018], retrieved from Url <httpi/smartphoneblogging_com/2009/09/a-longterm-windows-mobile-user-switching-to-android-part-5-htc-sense-widgets-eviewt>, 27 pages.
communication Pursuant to Article 94(3) Epc issued in European Application No. 11706120.0 on Apr. 5, 2018, 6 pages.

* cited by examiner

```xml
<?xml version="1.0" encoding="UTF-8"?>
<xs:schema xmlns:xs="http://www.w3.org/2001/XMLSchema">
    <xs:element name="view">
        <xs:simpleType>
            <xs:restriction base="xs:string">
                <xs:enumeration value="travel"/>
            </xs:restriction>
        </xs:simpleType>
    </xs:element>
    <xs:element name="refreshrate">
        <xs:simpleType>
            <xs:restriction base="xs:byte">
                <xs:enumeration value="0"/>
            </xs:restriction>
        </xs:simpleType>
    </xs:element>
    <xs:element name="liveiconconfig">
        <xs:complexType>
            <xs:sequence>
                <xs:element ref="refreshrate"/>
                <xs:element ref="view"/>
                <xs:element ref="actiontype" maxOccurs="unbounded"/>
                <xs:element ref="actioninfo" maxOccurs="unbounded"/>
            </xs:sequence>
            <xs:attribute name="name" use="required">
                <xs:simpleType>
                    <xs:restriction base="xs:string">
                        <xs:enumeration value="liveiconname"/>
                    </xs:restriction>
                </xs:simpleType>
            </xs:attribute>
        </xs:complexType>
    </xs:element>
    <xs:element name="actiontype">
        <xs:simpleType>
            <xs:restriction base="xs:string">
                <xs:enumeration value="application"/>
                <xs:enumeration value="browser"/>
            </xs:restriction>
        </xs:simpleType>
    </xs:element>
    <xs:element name="actioninfo" type="xs:string"/>
</xs:schema>
```

Annotations: 500 (overall), 502, 504, 506, 508

```xml
<?xml version="1.0" encoding="utf-8" ?>

<liveiconconfig name="vznavigator">
        <refreshrate>0</refreshrate>
        <view>travel</view>
        <actiontype>application</actiontype>
        <actiontype>browser</actiontype>
        <actioninfo>VZNavigator</actioninfo>
        <actioninfo>http://www.blackberry.com/VirtualPreload/?url=http://
        mobile.vzw.com/vzstart/actions/
        links.do%3FtargetUrl=NAVIGATOR_BBLINK%26methodTocall=takeToLinks&language=en</actioninfo>
</liveiconconfig>
```

FIG. 6

METHODS AND APPARATUS FOR PROVIDING UPDATED CONTENT IN A USER INTERFACE

FIELD OF DISCLOSURE

The present disclosure relates to portable electronic devices, including but not limited to, methods and apparatus for providing updated content in a user interface.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities, etc.

A user typically interacts with an electronic device via a graphic user interface (GUI). For example, a graphic user interface provides a display format to convey information to a user and receive inputs or commands from a user. A user can navigate through menu items such as icons, action commands, etc., to input information, choose commands, activate applications programs, manage files, and/or perform other functions. To select certain commands or functions such as, for example, to reply to an email communication, a user typically navigates through one or more menu items or icons to choose or select the desired command. Selection of a menu item or icon causes the graphic user interface to present the selected application, service, function, and/or file.

BRIEF DESCRIPTION OF THE DRAWINGS

FIG. 5 illustrates an example configuration file schema to provide a live icon to the live icon subsystem of FIGS. 1 and 2.

FIG. 6 illustrates an example configuration file to provide an example live icon to the live icon subsystem of FIG. 2.

DETAILED DESCRIPTION

Figure 1:
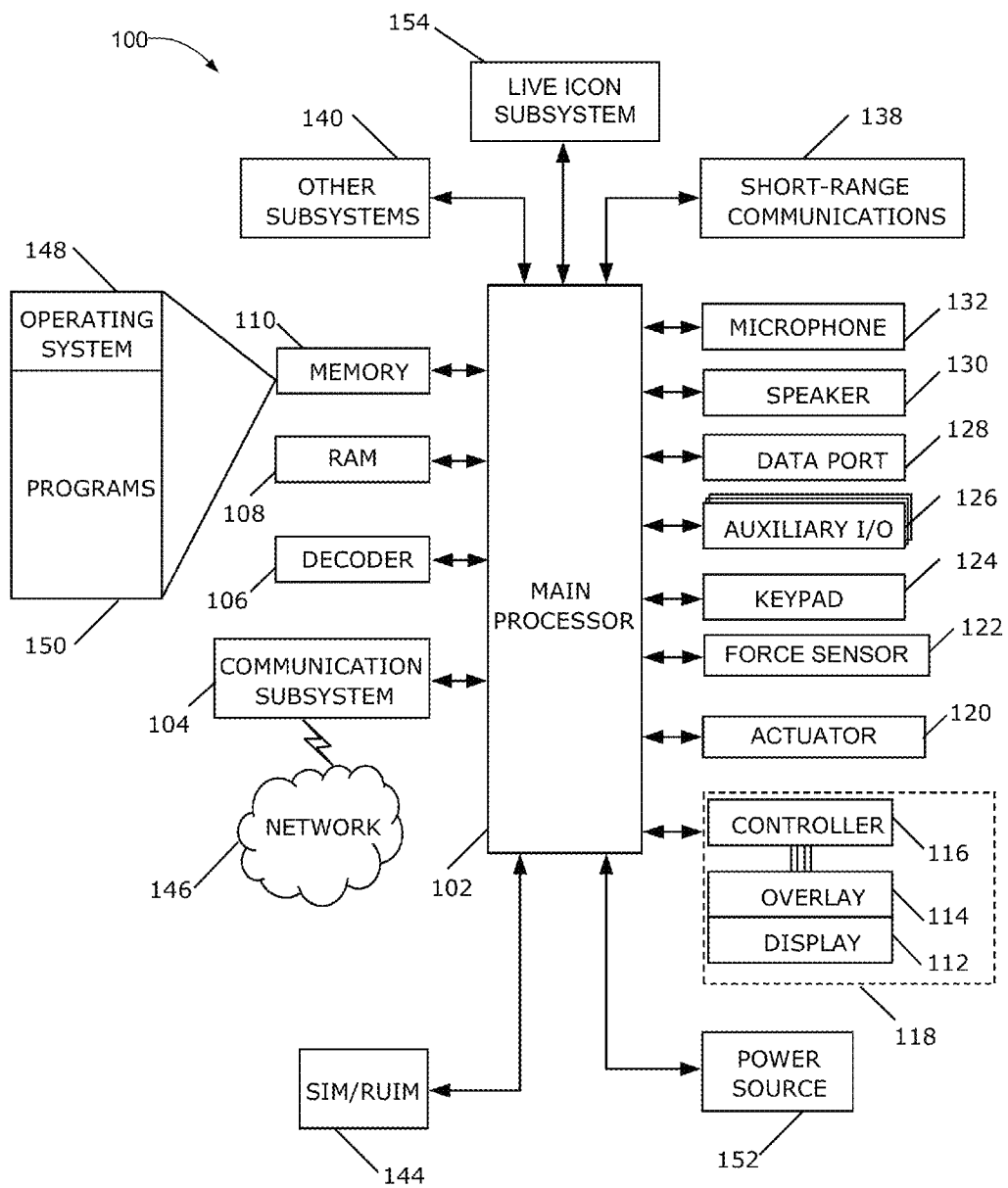
FIG. 1 is a block diagram of an example portable electronic device in accordance with the disclosure.

Example methods and apparatus disclosed herein can be used to implement a portable electronic device such as, for example, a cellular device. In general, the example methods and apparatus disclosed herein provide a user interface for the portable electronic device. The example methods and apparatus disclosed herein include a framework to provide a user interface to a portable electronic device such as for example in a smartphone. In particular, example methods and apparatus display icons that provide real-time or updated content to users at regular and/or irregular intervals. Icons may be installed on the portable electronic device to serve different purposes, and the example framework enables a user of the portable electronic device to navigate through multiple ones of the icons to view the content.

Additionally, the example framework enables a user to select any of the icons to initiate an action on the portable electronic device, such as launch a native application or a third-party application associated with the icon to receive more information about the content displayed on the icon. Example methods and apparatus are disclosed herein to provide an improved user interface to the user of the portable electronic device, such as to provide contextually-relevant (e.g., appropriate to the current time and/or location of the portable electronic device) information to the user in a convenient icon. The example framework is flexible and permits developers and publishers of icons and/or applications to provide customized user interfaces associated with their respective software.

Example methods disclosed herein receive an icon configuration file, install an icon associated with the configuration file in an icon repository on a portable electronic device, display the icon with first content in a user interface on the portable electronic device, receive second content based on the configuration file, and display the icon with the second content in the user interface.

Example apparatus disclosed herein include a live icon package manager to install a live icon, a live icon viewer to provide a user interface including the live icon displaying first content and to provide the user interface including the live icon displaying second content, a web browser manager to update the live icon with the second content, and a live icon manager to provide the live icon from the live icon repository to the live icon viewer and to initiate an action in response to a selection of the live icon in the live icon viewer.

Example systems disclosed herein include an installation server to provide to a portable electronic device a live icon package including at least a configuration file, and a content server to provide to the portable electronic device first content to be displayed on a live icon installed from the live icon package provide to the portable electronic device, to receive a request for updated content from the portable electronic device, and to provide the second content to the portable electronic device for display on the live icon.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the examples described. The description is not to be considered as limited to the scope of the examples described herein.

A block diagram of an example portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuator apparatus 120, one or more force sensors 122, a keypad 124, an auxiliary input/output (I/O) subsystem 126, a data port 128, a speaker 130, a microphone 132, short-range communications 138, and other device subsystems 140. User-interaction with a graphical user interface is performed through the touch-sensitive display 118. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. In some examples, the display 112 may include a primary display and a secondary display. The display of information between the primary and the secondary displays are coordinated to provide information to a user when, for example, the portable electronics device 100 is in an open position and/or a closed position.

To identify a subscriber for network access, the portable electronic device 100 uses a Subscriber Identity Module or a Removable User Identity Module (SIM/RUIM) card 144 for communication with a network, such as the wireless network 146. Alternatively, user identification information may be programmed into memory 110.

The portable electronic device 100 includes an operating system 148 and software programs or components 150 that are executed by the processor 102 to implement various applications and are typically stored in a persistent, updatable store such as the memory 110. Additional applications or programs may be loaded onto the portable electronic device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example e-mail messages, which may be transmitted over the wireless network 146 through the communication subsystem 104. For voice communications, the overall operation of the portable electronic device 100 is similar. The speaker 130 outputs audible information converted from electrical signals, and the microphone 132 converts audible information into electrical signals for processing.

The example portable electronic device 100 of FIG. 1 further includes a live icon subsystem 154. The live icon subsystem 154 of the illustrated example provides a user interface that may be displayed via the example display 112. A user of the example portable electronic device 100 may interact with the example live icon subsystem via any of the inputs and/or outputs of the portable electronic device 100, such as the actuator 120, the force sensor 122, the keypad 124, the auxiliary I/O subsystem 126, the data port 128, the speaker 130, the microphone 132, the short-range communications subsystem 138, and/or any other input and/or output subsystem.

The example live icon subsystem 154 of FIG. 1 displays (via the display 112) one or more icons to the user. In some examples described below, the icons include live icons. A live icon, as used herein, refers to a visual representation of a service or application of the portable electronic device 100. In some examples, live icons display real-time content and/or near-real-time content from a service or application. Some example live icons provide pictorial representations of services and/or applications, and/or display dynamic information related to services and/or applications. The dynamic information may be updated and displayed to a user of the portable electronic device 100. In some examples, the live icons may be selected to open any of an overlay interface to display content to the user, an application or service native to the portable electronic device 100, and/or an add-on or third-party application that is not native to the portable electronic device 100.

In some examples, the portable electronic device 100 selects, receives, and installs live icons, which are then added to a user interface presented on the display 112. The example live icon subsystem 154 detects, installs, manages, updates, displays, and/or uninstalls live icons. Display of the live icons may be based on contextual information (e.g., information relating to the current time, location of the device, etc.) and/or preferences of the user available to the example portable electronic device 100. A more detailed example of a live icon subsystem is disclosed below.

Figure 2:
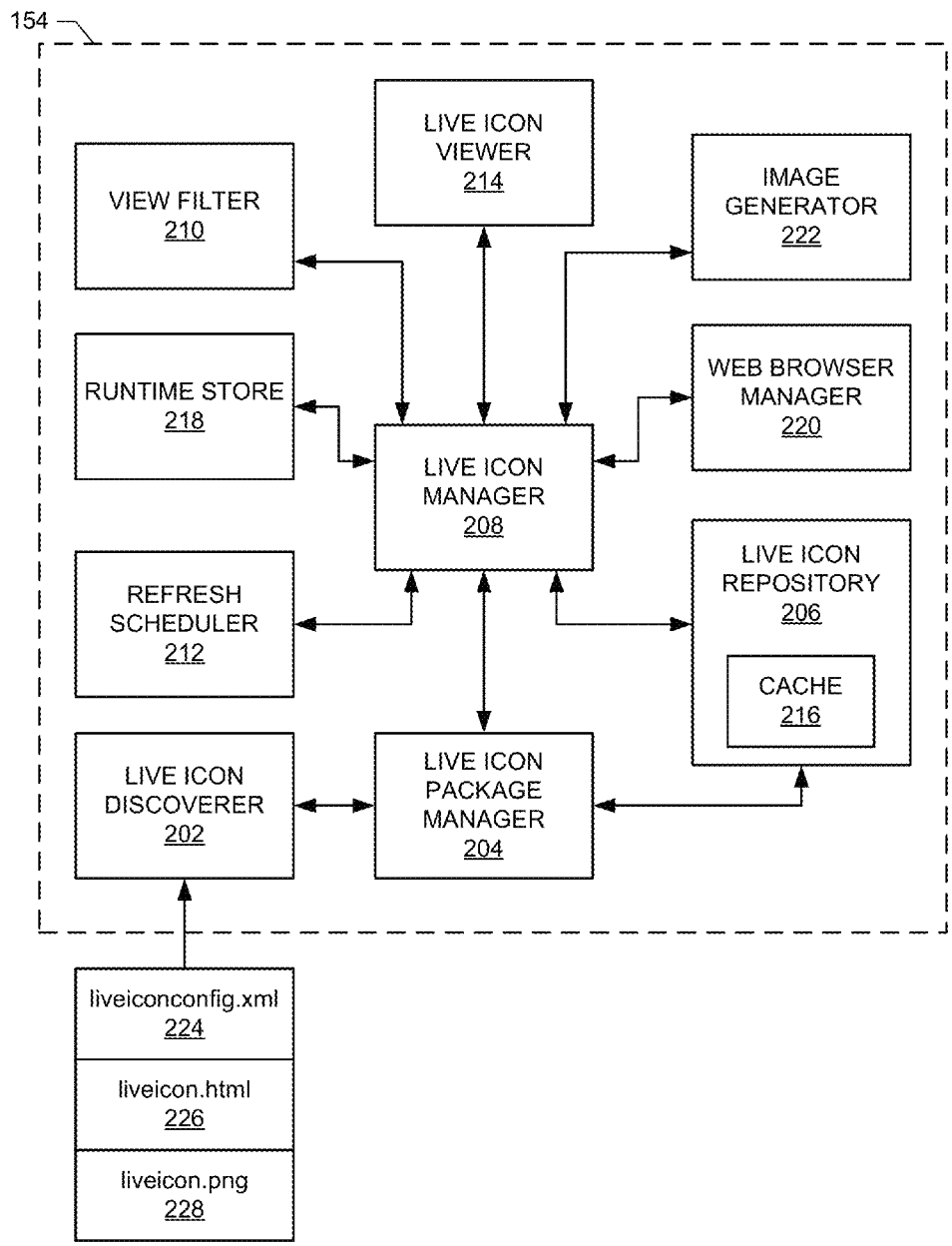
FIG. 2 is a more detailed block diagram of the example live icon subsystem of FIG. 1.

FIG. 2 is a more detailed block diagram of the example live icon subsystem 154 of FIG. 1. The example live icon subsystem 154 illustrated in FIG. 2 includes a live icon discoverer 202, a live icon package manager 204, a live icon repository 206, a live icon manager 208, a view filter 210, a refresh scheduler 212, and a live icon viewer 214, a runtime store 218, a web browser manager 220, and an icon image generator 222. The example live icon repository 206 includes a cache 216. The live icon subsystem 154 of the illustrated example is to detect, install, manage, update, display, and/or uninstall icons (e.g., live icons) to provide a user interface.

The example live icon discoverer 202 monitors the example portable electronics device 100 for installation, updating, and/or uninstallation of applications. For example, when the portable electronic device 100 receives an application for installation, the received application includes a package of files that are used to install the application. The example live icon discoverer 202 identifies the received application and inspects the corresponding application package of files to determine whether the application package includes a live icon package. In some examples, the live icon discoverer 202 identifies a live icon package instead of an application package.

In some examples, the live icon discoverer 202 reads the description of each file in the package to determine whether the description includes a reserved string, such as "LIVE-ICON." If the live icon discoverer 202 does not find the reserved string in any of the file descriptions, the live icon subsystem 154 does not take further measures with respect to the package. If, on the other hand, the live icon discoverer 202 identifies the reserved string in at least one of the files, the live icon discoverer 202 notifies the live icon package manager 204 to process a live icon package from the received application and/or live icon package.

In some examples, the live icon subsystem 154 is installed after one or more other applications including live icons are installed. In this case, the example live icon discoverer 202 of FIG. 2 identifies the applications that include live icons at the first launch of the live icon subsystem 154. The example live icon discoverer 202 detects the live icons (e.g., by detecting a reserved string in a description) and notifies the live icon package manager 204 for each identified live icon.

The example live icon package manager 204 receives the notification from the live icon discoverer 202. In response to the notification, the example live icon package manager 204 maps the application and/or live icon package identified by the live icon discoverer 202 to a live icon object. The example live icon package manager 204 creates a live icon object for each example live icon so that the live icon subsystem 154 may interact with the live icon. The example live icon package manager 204 of FIG. 2 also interacts with the live icon repository 206 to manage live icon objects.

An example live icon object includes a configuration file 224, a content file 226, and a background image file 228. The example configuration file 224 is an XML file that includes configuration information for the live icon that corresponds to a configuration schema. An example configuration schema is illustrated in FIG. 5 and an example configuration file corresponding to the configuration schema is illustrated in FIG. 6. The example content file 226 of FIG. 2 is a web document such as an HTML file. In some examples, the content file 226 further includes JAVASCRIPT® code and/or JAVA™ code. Other web technologies may additionally or alternatively be used. The content 226 and background files 228 are used by the example live icon viewer 214 to provide a user interface to a user of the portable electronic device 100. Some example live icon objects omit the background file, while some example live icon objects include additional content files such as JAVASCRIPT files, CSS files, and/or other types of web documents.

The example live icon repository 206 stores the live icon objects and live icon data associated with the objects. The example live icon repository 206 also receives changes to the live icon data, such as updated information to be presented to a user of the portable electronic device 100 via a live icon.

The example live icon repository 206 is implemented in a persistent memory of the example portable electronics device 100. For example, the live icon repository 206 may be a portion of the memory 110 and/or may be accessible via the data port 128 and/or an auxiliary I/O port 126 (e.g., via a portable memory device such as a Secure Digital memory card, a Compact Flash memory card, a Memory Stick, a MultiMediaCard, an xD Picture Card, a Smart Media card, and/or other types of memory).

The example cache 216 is provided with the live icon repository 206 for rapid retrieval of live icon objects. The example cache 216 may be implemented in, for example, volatile memory (e.g., the RAM 108 of FIG. 1) to facilitate rapid retrieval during execution of the example live icon subsystem 154.

The example live icon manager 208 of FIG. 2 manages the live icon objects that are installed in the live icon repository 206. For example, the live icon manager 208 of FIG. 2 determines which of the live icons, corresponding to the live icon objects stored in the live icon repository 206, are to be displayed to the user via the live icon viewer 214. The live icon viewer 214 of the illustrated example displays a set of initial (e.g., default) live icons to the user. The user may scroll through the live icon viewer 214 to view other icons besides what is displayed in the initial set. In some examples, the live icon manager 208 determines which live icons are to be displayed in the initial set based on contextual information. Example contextual information includes a location of the portable electronic device 100, a local time of the portable electronic device 100, and/or an event stored on the portable electronic device 100. For example, the live icon manager 208 of the illustrated example may determine that the portable electronic device 100 is currently displaying a "travel" view via the user interface based on the location of the portable electronic device 100. Based on the travel view, the live icon manager 208 may filter live icons provided to the live icon viewer 214 to display live icons that include the local weather, upcoming flight status, and/or local attractions. The example live icon manager 208 determines the live icons that are to be shown in a particular view based, at least in part, on view information included in the configuration file 224 of each of the example live icon objects corresponding to the example live icons.

The example live icon manager 208 also determines an action to be performed when a live icon is selected by the user (e.g., clicked). Each of the example live icons includes at least one designated action to be performed upon selection. For example, the actions may include launching an application native to the portable electronic device 100, launch a third-party (e.g., non-native) application, and/or display an overlay screen to the user with information associated with the live icon information. When the example live icon manager 208 receives a notification of a live icon selection (e.g., from the example live icon viewer 214 of FIG. 2), the live icon manager 208 determines the action to be taken based on the configuration file 224 of the live icon object corresponding to the live icon and/or the availability of potential actions. For example, if an action is listed in the configuration file but the action is not enabled on the portable electronic device 100 (e.g., an application corresponding to an action is not installed on the portable electronic device 100), the example live icon manager 208 invokes a secondary and/or tertiary action.

The live icon manager 208 of the illustrated example also interacts with the live icons in the live icon viewer 214. For example, when a live icon is refreshed via an auto-refresh (e.g., self-refresh) routine in the live icon, the live icon queries a content server (e.g., content server 804 of FIG. 8 via the communication subsystem 104). The content server returns content to the example live icon in HTML and/or Javascript format, such as in an updated content file 226, which the live icon viewer 214 renders to present the updated content to the user. When the user selects the live icon displaying updated content, the example live icon manager 208 retrieves action information from the updated content.

In some examples, an HTML document that provides updated content to the example live icon includes a meta tag designated for use with the example live icon manager 208. In particular, the example live icon manager 208 identifies the meta tag to retrieve the action information. The live icon manager 208 retrieves the action information when the live icon is selected. An example meta tag includes a pre-defined designator (e.g., name="parameter") and includes the action information (e.g., content="example content"). An example meta tag may therefore be:

<meta name: "parameter" content="example content"/>.

Example action information is based on the desired action (e.g., launching an application, launching a web browser, etc.) and may include an open and/or proprietary content identifier understandable to the application, a location where the web browser may retrieve a web page for display, a complete definition of content to be displayed in an overlay, and/or other types of action information that may be meaningfully passed to an application or overlay.

In some examples, the live icon manager 208 exchanges information with an application. Some types of applications may not be able to communicate directly with the example live icon manager 208. To receive information from the live icon manager 208, these example applications retrieve information from a runtime store 218. The example runtime store 218 of FIG. 2 is implemented in the RAM 108 and/or in the memory 110 of FIG. 1. The example live icon manager 208 places information (e.g., a parameter to be provided to the application) into the runtime store 218 in response to a selection of a corresponding live icon from the live icon viewer 214. Similarly, the example application may place data into the runtime store 218 for retrieval by the live icon manager 208.

The example view filter 210 of FIG. 2 provides an additional filter for showing live icons to a user of the portable electronic device 100. In particular, the example view filter 210 allows a user to arrange live icons within a view and/or associate live icons with different views according to the user's preference. The view filter 210 stores the arrangement(s) and/or preference(s) in, for example, the memory 110 of FIG. 1 and/or the live icon repository 206.

In an example of filtering the display of live icons, the user of the example portable electronic device 100 has a flight scheduled in a calendar application, including flight number, time, origin, and/or destination. Based on the scheduled flight and the proximity of the flight to the current time, the view filter 210 determines that a flight tracker application installed on the portable electronic device 100 is highly relevant to the user and instructs the live icon manager 208 and/or the live icon viewer 214 to display the live icon of the flight tracker application to the user in the initial set of live icons. When the user selects the live icon of the flight tracker application, the live icon manager 208 opens an overlay that includes the flight status and/or a weather forecast at the destination.

In another example, the user of the example portable electronic device 100 has an appointment programmed into the calendar application. Based on the appointment and the proximity of the appointment to the current time and/or location of the example portable electronic device 100, the example view filter 210 instructs the live icon manager 208 and/or the live icon viewer 214 to display a live icon associated with a map application to the user via the display 112. When the user selects the live icon associated with map application, the example live icon manager 208 opens the map application (e.g., a native or third-party application) to display a driving route between the location of the portable electronic device 100 and the location of the appointment and/or traffic information.

In another example, the view filter 210 monitors the usage of applications on the portable electronic device 100 to determine which applications are most-often used by the user and/or which live icons are most often selected by the user. Based on the monitored usage, the view filter 210 arranges the example live icons to present the most-often used live icons and/or live icons associated with the most-often used applications as a default set of live icons. However, the example view filter 210 may determine that other contextual information (e.g., upcoming appointments, etc.) is more important than usage in determining an initial set of live icons to display to the user, and overrides another set of live icons accordingly. In some examples, the view filter 210 may instruct the live icon manager 208 and/or the live icon viewer 214 to display a mixed set of contextual (e.g., timely) live icons and often-used live icons to improve convenience to the user of the example portable electronic device 100.

In some examples, the view filter 210 of FIG. 2 instructs the live icon manager 208 to provide one or more live icons to the live icon viewer 214 based on a condition, trigger, or trigger event. If the view filter 210 does not identify the trigger, the live icon manager 208 does not provide the live icon dependent on the trigger to the live icon viewer 214, and the live icon is therefore not displayed to the user in an initial set of live icons or in the carousel. An example trigger for a flight status live icon is an impending flight scheduled into the calendar application of the example portable electronic device 100. When the example view filter 210 detects that the scheduled flight is less than 12 (or other predetermined number) hours away from the current time, the view filter 210 determines that the flight tracking live icon is triggered. In response to the trigger, the view filter 210 instructs the live icon manager 208 to provide the flight status live icon to the live icon viewer 214. In some examples, the view filter 210 further instructs the live icon manager 208 to include the triggered live icon in the initial set of live icons displayed to the user, which may increase the likelihood that the user will observe the triggered live icon.

The example refresh scheduler 212 schedules refreshing of information displayed by the live icons. Refreshing an example live icon includes accessing an external database for information that may include more recent data, rendering the live icon with updated information, and displaying the rendered live icon to the user. In some examples, the refresh scheduler 212 schedules the refresh in the implementation of the live icon (e.g., in HTML and/or Javascript code that defines the live icon). For example, the live icon may include an HTML META-Refresh tag and/or a Javascript function.

In some examples, the refresh scheduler 212 schedules the refresh to be performed by the live icon manager 208. For example, the refresh scheduler 212 to identifies and stores the refresh rate of a live icon in the configuration file 224 of the live icon object corresponding to the live icon stored in the live icon repository 206. The live icon manager 208 identifies live icons that are to be refreshed by the live icon manager 208 (e.g., via a refresh call), and executes the refreshes at the designated times. For example, the live icon manager 208 monitors a timer based on an internal clock of the portable electronic device 100 and refreshes live icons when corresponding refresh intervals have lapsed. The live icon configuration files may be used to indicate to the refresh scheduler 212 whether the live icon manager 208 and/or the refresh scheduler 212 are responsible for updating the live icon. For example, if the live icon object configuration file includes a valid value (e.g., a value greater than 0, a value within a predefined range, etc.) associated with a <refresh> (or similar) HTML tag, the refresh scheduler 212 schedules refreshes to be performed via the live icon manager 208 according to the value. If, on the other hand, the example live icon object configuration file does not include a valid value associated with the <refresh> tag (e.g., a value of 0, a negative value, etc.), the refresh scheduler 212 assumes that the live icon auto-refreshes (e.g., via HTML and/or Javascript code) and does not schedule a refresh for that live icon.

By providing a live icon with an automatic refresh, the developer of a live icon may control and/or change the refresh interval by changing the parameters of a <refresh> tag when the live icon updates. On the other hand, a live icon that is refreshed according to a configuration file 224 setting is reliably refreshed according to the refresh schedule, unless the configuration file for the live icon is changed (e.g., via an update of the live icon). The example refresh scheduler 212 of FIG. 2 further includes a refresh time-out to refresh an otherwise auto-refreshing live icon. The refresh timeout, if provided, can ensure that an auto-refreshing live icon does not fail to receive updated content for an extended period.

The example live icon viewer 214 is a user interface element that provides live icon views to the display 112 of FIG. 1 to be shown to the user. The example live icon viewer 214 receives live icons determined by the example live icon manager 208 and/or the example view filter 210 and displays the live icons via the display 112. Examples of the live icon viewer 214 and live icons are described below and illustrated in FIGS. 7A-7C.

The live icon viewer 214 of the illustrated example is a user interface component. The example live icon viewer 214 receives images of rendered live icons from the live icon manager 208 and displays the live icon images. As described in more detail below, the example web browser manager 220 and the example image generator 222 provide the live icon images to the live icon manger 208. The example live icon viewer 214 of FIG. 2 presents several individual live icons to the user (e.g., via the display 112) and receives selections of live icons by the user (e.g., clicks on the live icons).

The example live icon viewer 214 of FIG. 2 allows the user to scroll through live icons to display desired live icons on the live icon viewer 214. In some examples, the live icons may be placed in a carousel-type arrangement, in which the user may scroll through the carousel to view the different live icons. The example live icon viewer 214 also allows the user to select (e.g., click) a live icon to view information associated with the live icon. For example, the user may select a sports news live icon displaying a sports news headline to view the full article. In another example, the user may select a social media live icon displaying a social media message to view a profile of the message poster and/or more information about the social media message (e.g., responses to the message by others, etc.). The example live icon viewer 214 notifies the live icon manager 208 of the selection, which causes the live icon manager 208 to handle the selection as described above.

The example web browser manager 220 renders the live icon background image(s) (if any) and/or the live icon content files in a web browser window. For example, the live icon manager 208 provides the background image file 228 and content file 226 (including e.g. web content) to the web browser manager 220, which renders the web content and the background icon as a web window. In some examples, the web window has a pre-defined resolution corresponding to an area on the display 112 which the live icon is designated. When the web browser manager 220 renders the background image and the web content, the web browser manager 220 notifies the image generator 222 to capture an image of the rendered web browser window. The example image generator 222 generates an image of the rendered window and provides the image to the live icon manager 208 with an identification of the live icon corresponding to the image. The example live icon manager 208 provides the live icon viewer 214 with the image and the identification, and the live icon viewer 214 displays the live icon image to the user via the display 112.

The example web browser manager 220 also manages the auto-refreshes (e.g., for auto-refreshing live icons) and/or initiates refreshes determined by the refresh scheduler 212. The browser objects may be refreshed to update content as a typical web browser window may be refreshed.

Figure 3:
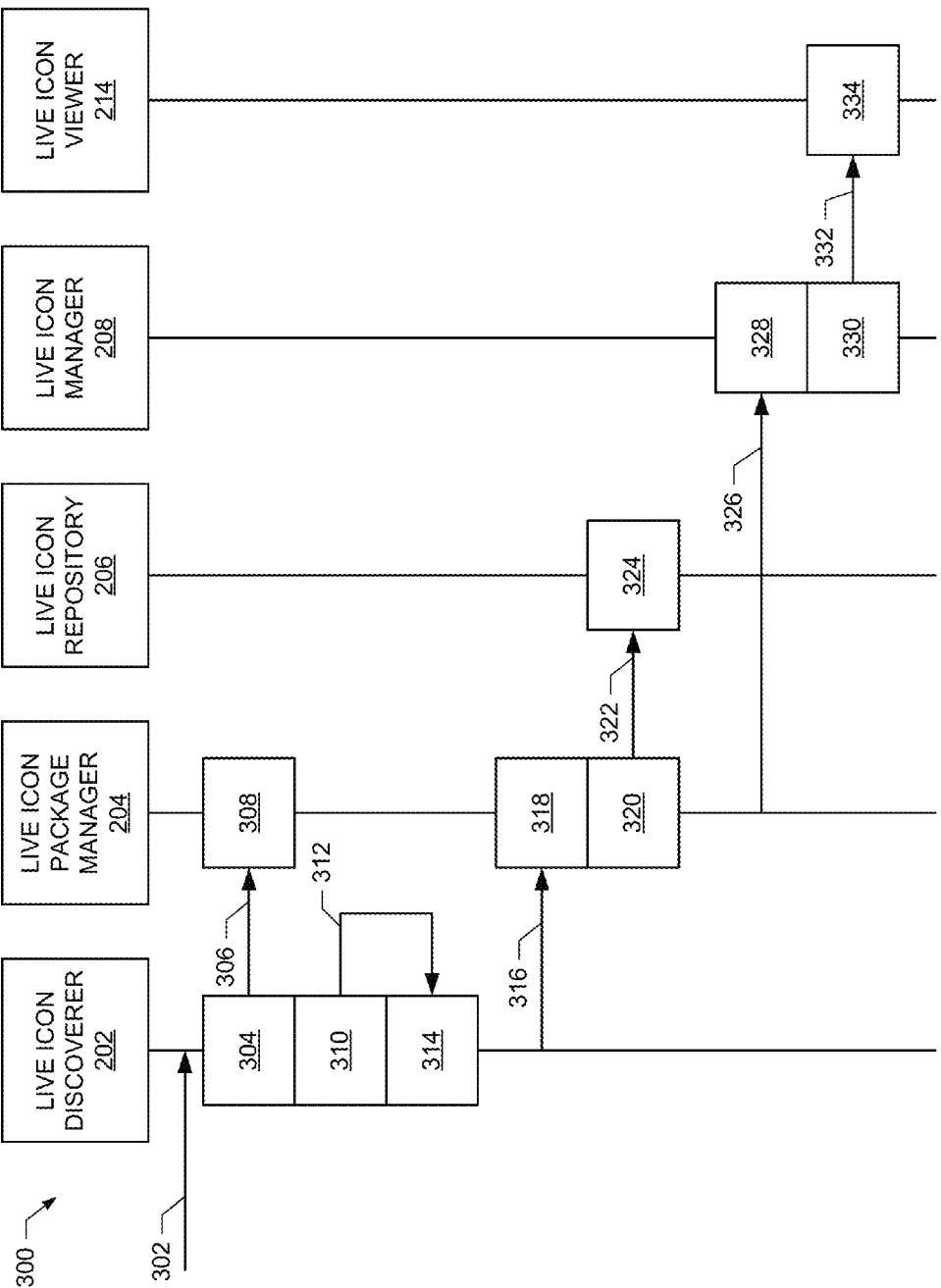
FIG. 3 is a flowchart illustrating an example communication flow to install a live icon using the example live icon subsystem of FIG. 2.

FIG. 3 is a flowchart illustrating an example communication flow 300 to install a live icon using the example live icon subsystem 154 of FIGS. 1 and 2. The example communication flow 300 will be described with reference to the live icon subsystem 154 of FIGS. 1 and 2. Prior to the example communication flow 300, the example live icon discoverer 202 and/or the example live icon package manager 204 of FIG. 2 are brought to an active state (e.g., as opposed to a passive or asleep state) in response to an action that has the potential to result in a live icon being installed. Example actions include, opening an application repository or store from which a user may select applications and/or live icons for receipt at a portable electronic device, opening a web browser from which the user may receive an application and/or a live icons, and/or opening other applications and/or services from which applications and/or live icons may be received.

The example communication flow 300 of FIG. 3 begins when an application and/or live icon package is received 302 at the portable electronic device 100 for installation. The example live icon discoverer 202 of FIG. 2 identifies the installation (block 304). The example live icon discoverer 202 transmits 306 a CreateObject message to the example live icon package manager 204, which creates a live icon object in response to the CreateObject message (block 308).

The example live icon discoverer 202 further inspects the received application and/or live icon package to determine whether a live icon is included (block 310). In the illustrated example, the live icon discoverer 202 detects that a live icon package is present and invokes 312 an appropriate routine (e.g., hasLiveIcon) to install the live icon. In some other examples in which the received application does not include a live icon, the live icon discoverer 202 invokes a different routine and/or returns to monitoring for live icons. Upon invoking 312 the installation routine, the example live icon discoverer 202 generates a message to the example live icon package manager 204 to add and/or install the live icon (block 314). The example live icon discoverer 202 then transmits 316 the message to the example live icon package manager 204.

The example live icon package manager 204 receives the message from the live icon discoverer 202 and parses the application and/or live icon package (e.g., reads a live icon configuration file 224) to identify the characteristics of the live icon (block 318). The live icon package manager 204 of the illustrated example then generates an instruction to the live icon repository 206 to add the live icon to the repository 206 (e.g., store the live icon configuration and/or other files) (block 320). In some examples, the live icon package manager 204 generates a live icon object and provides the live icon object to the live icon repository 206 for storage. The example live icon package manager 204 sends 322 the instruction (e.g., an addLiveIcon instruction), which is received at the live icon repository 206. The example live icon repository 206 stores the files (e.g., a live icon object) associated with the live icon and based on the message from the live icon package manager 204. In some examples, the live icon repository 206 confirms that the live icon was successfully stored.

The example live icon package manager 204 further provides 326 the live icon (e.g., the live icon object, an identification of the live icon object stored in the repository 206, etc.) to the live icon manager 208. The example live icon manager 208 receives (block 328) the live icon and/or information associated with the live icon and updates the live icon viewer 214 (block 330). In some examples, the live icon manager 208 transmits an updateViewer message 332 to update the live icon viewer 214 when the live icon is to be immediately displayed in the live icon viewer 214. In some examples, the live icon manager 208 transmits the updateViewer message 332 to update the live icon viewer 214 even if the live icon is not immediately displayed to the user (e.g., when the live icon is placed in the carousel but is not shown on the display 112 until a user scrolls through the live icons).

The example live icon viewer 214 receives the updateViewer message 332 and places the installed live icon in the appropriate position (block 334). In some examples, the installed live icon is placed on-screen (e.g., displayed in the live viewer portion of the display 112) for immediate viewing by the user. In some other examples, the installed live icon is placed in the carousel but not on-screen.

After executing the example communication flow 300 of FIG. 3, the example live icon discoverer 202 and/or the example live icon package manager 204 of FIG. 2 may revert to a passive mode.

The communication flow 300 of the illustrated example may be modified to handle live icon updates (e.g., installation of a newer version of a live icon) and/or uninstallations of live icons (e.g., removal of a live icon from the portable electronic device 100). For example, the blocks and/or messages 316-334 may be modified to uninstall a live icon by removing the live icon object from the live icon repository 206 and the live icon manager 208, and then updating the live icon viewer 214. To update an existing live icon object, the example blocks and/or message 316-334 may be modified to uninstall an existing live icon object, install a new live icon object corresponding to the uninstalled live icon object, and then updated the live icon viewer 214 to use the updated live icon object.

Figure 4:
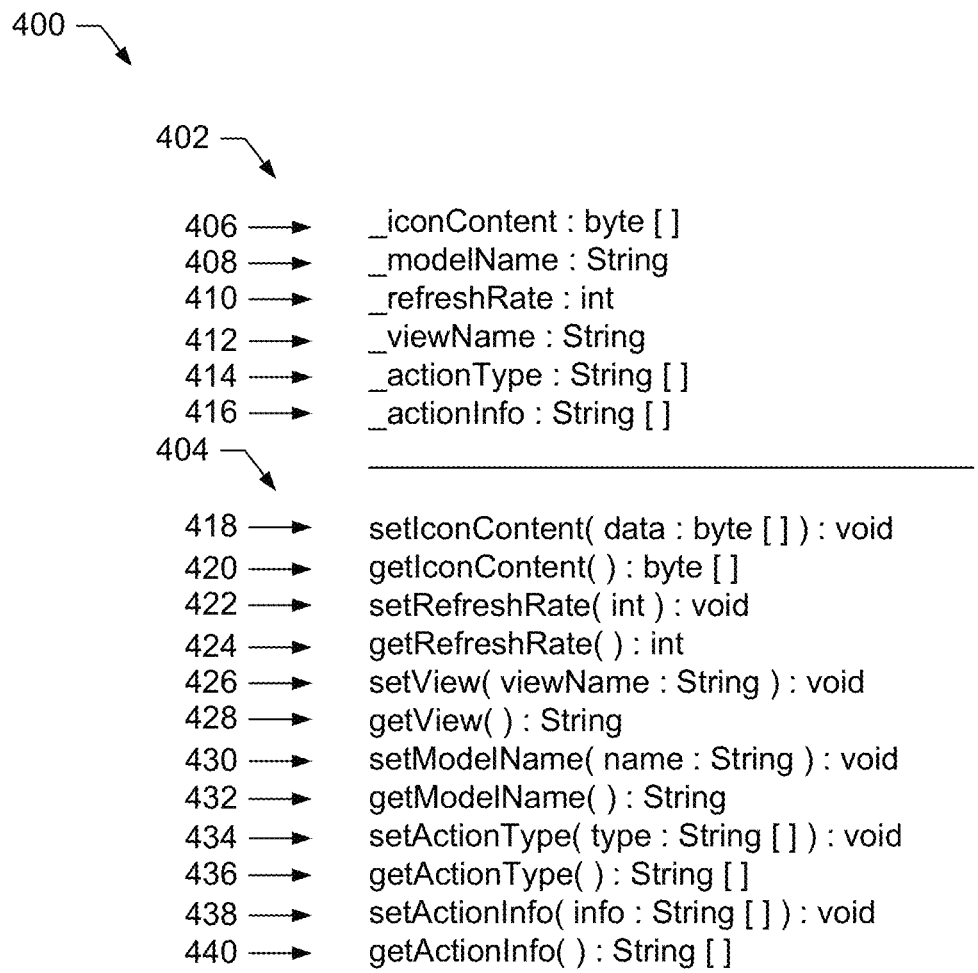
FIG. 4 illustrates an example live icon model to implement a live icon in the live icon subsystem of FIGS. 1 and 2.

FIG. 4 illustrates an example live icon model 400 to implement a live icon in the live icon subsystem 154 of FIGS. 1 and 2. The example live icon model 400 includes variable types 402 and functions 404 that are used to interact with and display the live icon model 400 to a user. As illustrated in FIG. 4, the variable types 402 defined in the example live icon model 400 include _iconContent 406 (e.g., an array of bytes used to define content to be displayed to the user by the live icon), _modelName 408 (e.g., a string including the title or object name of the live icon object), _refreshRate 410 (e.g., an integer defining a rate at which the live icon content is to be refreshed and/or an indicator that the live icon auto-refreshes), _viewName 412 (e.g., a string indicating a view with which the live icon is associated), _actionType 414 (e.g., a string array indicating an action that is to be performed upon selection of the live icon by a user), and _actionInfo 416 (e.g., a string array indicating information that is to be supplied for performance of an _actionType).

The example live icon model 400 also includes and/or interfaces with functions 404, including setIconContent 418, getIconContent 420, setRefreshRate 422, getRefreshRate 424, setView 426, getView 428, setModelName 430, getModelName 432, setActionType 434, getActionType 436, setActionInfo 438, and getActionInfo 440. The example functions 404 of FIG. 4 are used to update (e.g., set) and/or retrieve (e.g., get) the respective example variables 402

FIG. 5 illustrates an example configuration file schema 500 to provide a live icon to the live icon subsystem 154 of FIGS. 1 and 2. The schema 500 of FIG. 5 illustrates example elements and characteristics of a configuration file that may be included in an application package and/or a live icon package. On receiving a configuration file, the example live icon package manager 204 compares the configuration file to an expected format defined by the example configuration file schema 500.

The example schema 500 includes a configuration file format and defines example elements 502, 504, 506, and 508. The example element 506 defines an example live icon configuration file, including the refresh rate, default view, action type, and action information for the live icon. The example schema 500 of FIG. 5 defines a default "travel" view for the example live icon (element 502), a default refresh rate (e.g., 0, auto-refresh) (element 504), and default primary and secondary actions (element 508).

FIG. 6 illustrates an example configuration file 600 to provide an example live icon to the live icon subsystem 154 of FIGS. 1 and 2. The example configuration file 600 illustrated in FIG. 6 follows the example configuration file schema 500 of FIG. 5 and is an example of configuration file 224 of FIG. 2. In particular, the configuration file 600 of FIG. 6 conforms to the element 506 of the example schema 500.

When example live icon package manager 204 of FIG. 2 parses the configuration file 600 based on the schema 500 of FIG. 5, the live icon package manager 204 determines several characteristics of the live icon associated with the configuration file 600 and generates the live icon object in the live icon repository 206 based on the configuration file. For example, the live icon package manager 204 determines from the "name" tag that the live icon has the name "vznavigator." The live icon name may be used to uniquely identify the live icon and/or the corresponding live icon object for interaction. The live icon package manager 204 further determines from the example configuration file that the associated live icon has a refresh rate of 0 (e.g., the live icon auto-refreshes), is associated by default with the "travel" view, has a default action on selection of opening the "VZNAVIGATOR®" application if installed on the portable electronic device 100, and has a secondary action of opening a browser to a web page defined in the configuration file.

In some examples, the live icon configuration schema 500 and the configuration file 600 further provide for a <bind> or similar tag to allow an application developer to "bind" a live icon to a particular application. If the example configuration file 600 includes a <bind> tag, the example live icon manager 208 determines whether a designated application is installed on the example portable electronic device 100. If the designated application is not installed, the live icon manager 208 provides static content to the example live icon viewer 214 for display in the live icon. For example, the static content may prompt the user to select the live icon to receive the designated application (e.g., displays a "Click to Install" message) at a portable electronic device. If the example live icon configuration file 600 does not include the <bind> tag and/or if the designated application is installed, the example live icon manager 208 updates the example live icon based on the <refresh> tag and displays updated content in the live icon via the live icon viewer 214. If the designated application is later uninstalled, the example live icon manager 208 replaces updated content with the example static content.

Figure 7A:
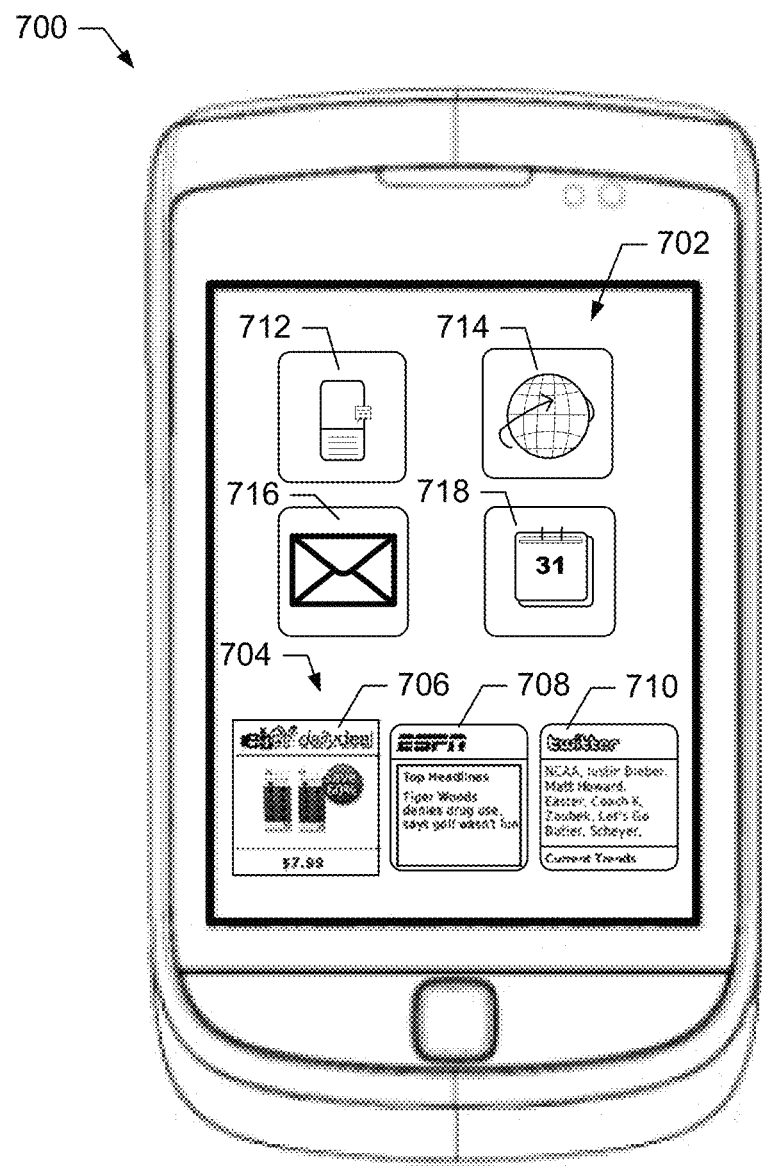
FIG. 7A depicts an example portable electronic device having an example user interface.

FIG. 7A depicts an example portable electronic device 700 having an example user interface 702. The example user interface 702 of FIG. 7A includes a live icon viewer 704 and three live icons 706, 708, and 710. The example user interface 702 further includes additional icons 712, 714, 716, and 718 to provide other functions to a user of the portable electronic device 700. In the example case of wherein the portable electronic device 700 is a smartphone, the icons 712-718 may include phone services 712, a web browser 714, an email application 716, and a calendar application 718. Any of the example icons 706-718 may be selected via any one or a combination of inputs to the portable electronic device 700, such as the example inputs described above with respect to FIG. 1.

As described above, the example live icon viewer 704 may display more or fewer live icons than the three live icons 706-710 depicted. Additionally, a user may scroll through the live icon viewer 704 to replace one or more of the live icons 706-710 with additional live icons for viewing. For example, if the user navigates to the right of the live icon viewer 704, the example live icons 706-710 are shifted to the left, in which case the live icon 706 is shifted off of the user interface 702 and another live icon is inserted on the right side of the example live icon viewer 704. Each of the example live icons 706-710 of FIG. 7A is rendered using a web page window and functions as a web page. Accordingly, the example live icons 706-710 are defined by their respective live icon object files (e.g. configuration file 224, content file 226 and/or background image file 228). While the example live icon subsystem 154 of FIG. 2 treats the live icons as web pages, other types of software objects may be used to implement the live icons.

The example live icon 706 of FIG. 7A is representative of eBay, a popular online auction web site. The live icon 706 of the illustrated example is installed when a user installs an eBay application on the portable electronic device 700. In the view of FIG. 7A, the example live icon 706 displays a featured item that changes once per day. When the live icon 706 is updated (e.g., by the refresh scheduler 212 and/or the live icon manager 208 of FIG. 2, and/or via auto-refresh), the live icon 706 is defined by an updated content file 226 or other file that includes updates (e.g. HTML document), which includes a <meta> tag to provide action information to the live icon manager 208 upon selection of the live icon 706.

Figure 7B:
FIG. 7B depicts the example portable electronic device of FIG. 7A including another example interface in response to selection of one of the live icons of FIG. 7A when the selected live icon is associated with an installed application.

FIG. 7B depicts the example portable electronic device 700 of FIG. 7A including another example interface 720 in response to selection of one of the live icons 706 of FIG. 7A when the selected live icon 706 is associated with an installed application. The example interface 720 of FIG. 7B presents an eBay application. When the example application depicted in FIG. 7B is launched in response to a selection of the example live icon 706, the example live icon manager 208 of FIG. 2 provides action information to the application based on the content displayed by the live icon. For example, if an item and a corresponding description are displayed in the live icon 706 when the live icon 706 is selected, the example live icon manager 208 provides action information identifying the displayed item, such as an item identification number, to the application. Instead of presenting a default or home interface as the application might be programmed to do when opened using a static application icon, the example application jumps to the example interface 720 in response to the action information to provide to the user additional information about the item displayed in the live icon 706.

Figure 7C:
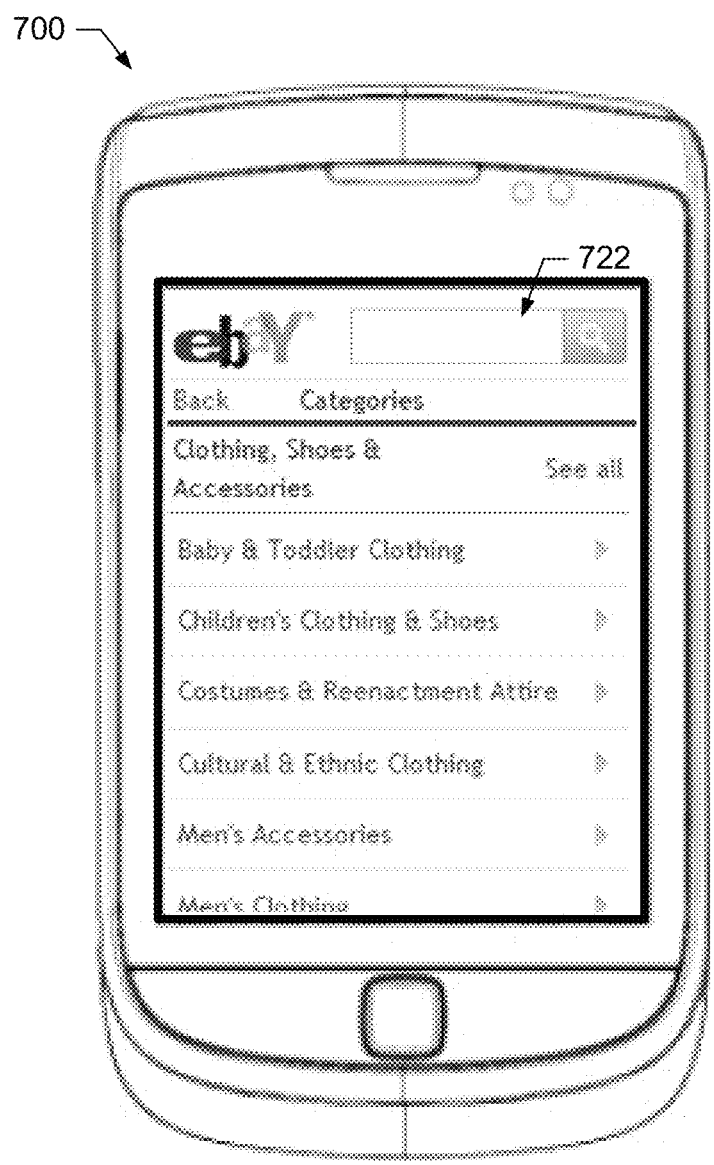
FIG. 7C depicts the example portable electronic device of FIG. 7A including another example interface in response to selection the example live icon of FIG. 7A when the selected live icon is associated with a web browser service.

FIG. 7C depicts the example portable electronic device 700 of FIG. 7A including another example interface 722 in response to selection the example live icon 706 of FIG. 7A when the selected live icon 706 is associated with a web browser action. The example web browser depicted in the interface 722 of FIG. 7C is a native application of the portable electronic device 700. Additionally, the example web browser is specified as a secondary action by the example live icon object corresponding to the live icon 706 of FIG. 7A. As a result, if the user selects the example live icon 706 of FIG. 7A and a primary action (e.g., launching the application depicted in FIG. 7B) is not available (e.g., the application is not installed on the portable electronic device 700), the example live icon manager 208 launches the secondary action and provides secondary action information (e.g., a web address) to provide the example interface 722.

Figure 7D:
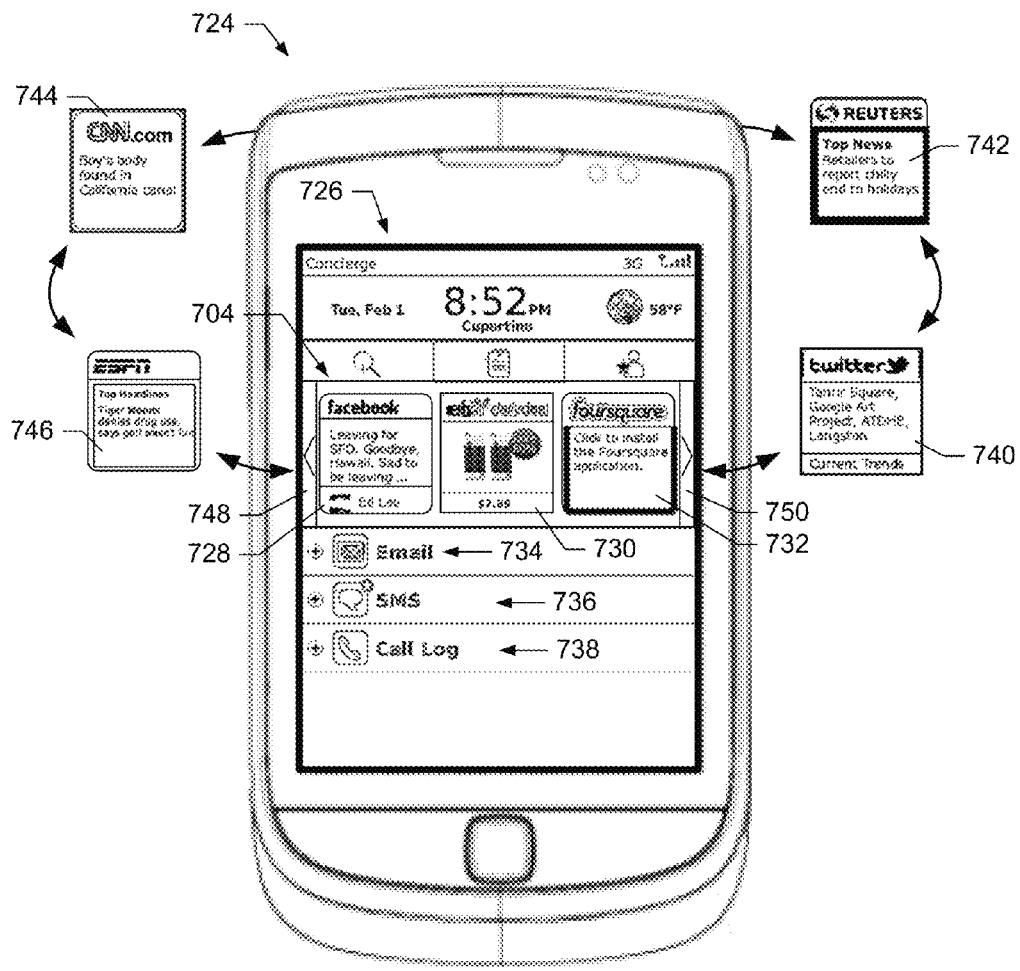
FIG. 7D depicts another example portable electronic device including an example user interface application.

FIG. 7D depicts another example portable electronic device 724 including an example user interface application 726. The example user interface application 726 of FIG. 7D includes the live icon viewer 704, which is displaying three live icons 728, 730, 732 in the illustrated example. The example user interface application 726 includes additional features such as email 734, short messaging service messages 736, and a call log 738. The live icon 728 is representative of a social media application installed on the portable electronic device 724, the live icon 730 is representative of an example online auction application installed on the portable electronic device 724, and the live icon 732 is representative of another social media application that is not yet installed on the portable electronic device 724.

As illustrated in FIG. 7D, the live icons 728, 730, 732 are arranged in the live icon viewer (e.g., the live icon viewer 704) with additional live icons 740, 742, 744, 746 in a carousel configuration. While the example live icons 728, 730, 732 are displayed in the illustrated user interface 726 of FIG. 7D, a user may scroll (e.g., left and/or right) through the example live icon viewer 704 to view others of the live icons 728, 730, 732, 740, 742, 744, 746. To facilitate scrolling, the example live icon viewer 214 includes scroll buttons 748, 750. The example scroll button 748 scrolls the live icons 728, 730, 732, 740, 742, 744, 746 one or more positions to the left, while the scroll button 750 scrolls the live icons 728, 730, 732, 740, 742, 744, 746 one or more positions to the right. The live icons 740, 742, 744, 746 are shown in FIG. 7D to illustrate the carousel configuration, and are not displayed to the user in the live icon viewer 704 in FIG. 7D. If the user scrolls through the example live icon viewer 704 in one direction, the example live icon viewer 704 cycles displaying the live icons 728, 730, 732, 740, 742, 744, 746 in a circular manner. In other words, the user may scroll through all of the live icons 728, 730, 732, 740, 742, 744, 746 continually and repeatedly using either scroll button 748, 750. In some other examples, the live icons 728, 730, 732, 740, 742, 744, 746 may be arranged such that the live icon viewer 704 stops scrolling in a particular direction (e.g., left or right scrolling) when a first live icon 728, 730, 732, 740, 742, 744, 746 is displayed and/or when a last live icon 728, 730, 732, 740, 742, 744, 746 is displayed.

In the illustrated example of FIG. 7D, the live icon 732 displays a message that prompts the user to install the associated social media application on the portable electronic device 724. The displayed message may be, for example, the default content stored on the portable electronic device 724, a default message displayed in the live icon 732 due to a <bind> tag, and/or updated content received from a content server (e.g. content server 804 of FIG. 8). When the user selects the live icon 732, the example live icon manager 208 opens the browser application installed on the portable electronic device, and directs the browser application to navigate to a page from which the user may receive the application associated with the live icon 732.

Figure 7E:
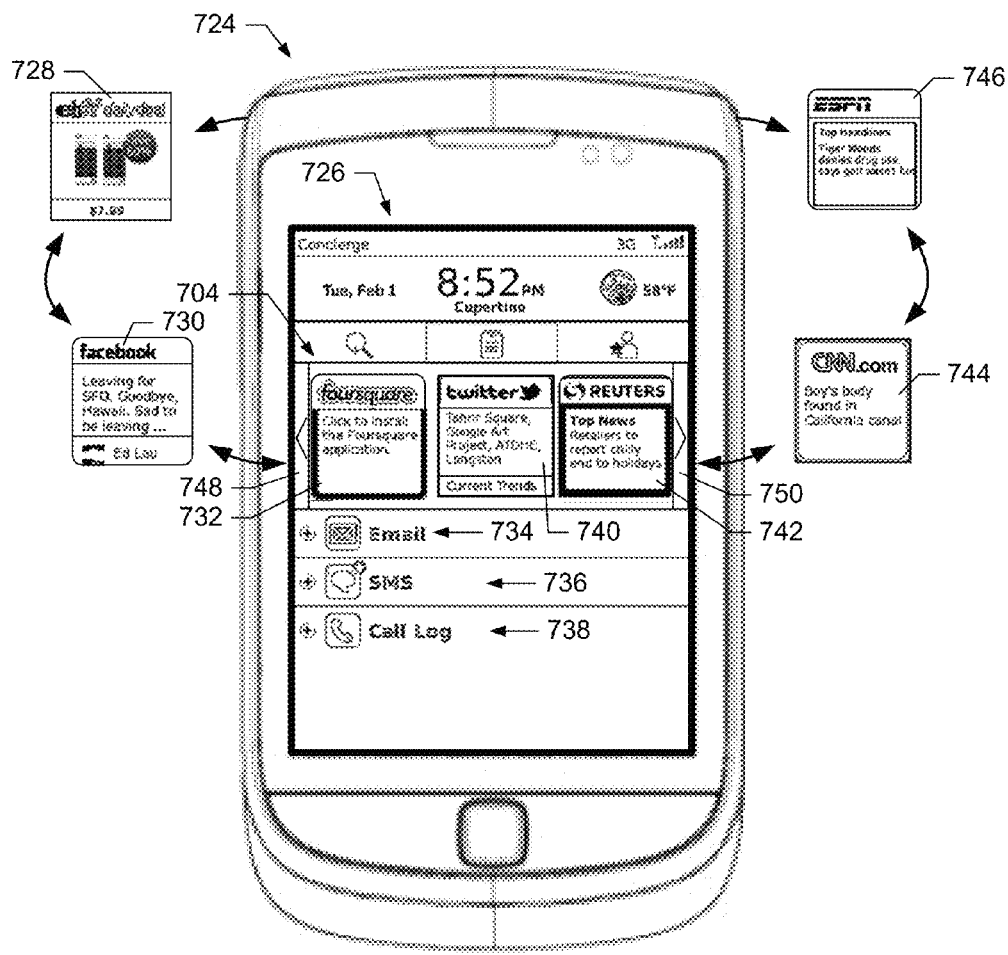
FIG. 7E depicts the example portable electronic device of FIG. 7D including the user interface application when a user scrolls through the live icons in a live icon viewer.

FIG. 7E depicts the example portable electronic device 724 of FIG. 7D having the user interface application 726 when a user scrolls through the live icons 728, 730, 732, 740, 742, 744, 746 in the live icon viewer 704. After scrolling (e.g., to the right), the example live icon viewer 704 displays the live icon 732 illustrated in FIG. 7D and two other live icons 740, 742. The user may scroll in steps of one or more live icons 728, 730, 732, 740, 742, 744, 746, and the live icon viewer 704 changes the displayed live icons 728, 730, 732, 740, 742, 744, 746 as the user scrolls (e.g., by selecting the scroll buttons 748, 750). The user interface application 726 and/or other user interface(s) on the example portable electronic device 724 may additionally or alternatively use types of live icons, and/or types of applications represented by live icons, other than the illustrated live icons 728, 730, 732, 740, 742, 744, 746 of FIGS. 7D and 7E.

Figure 8:
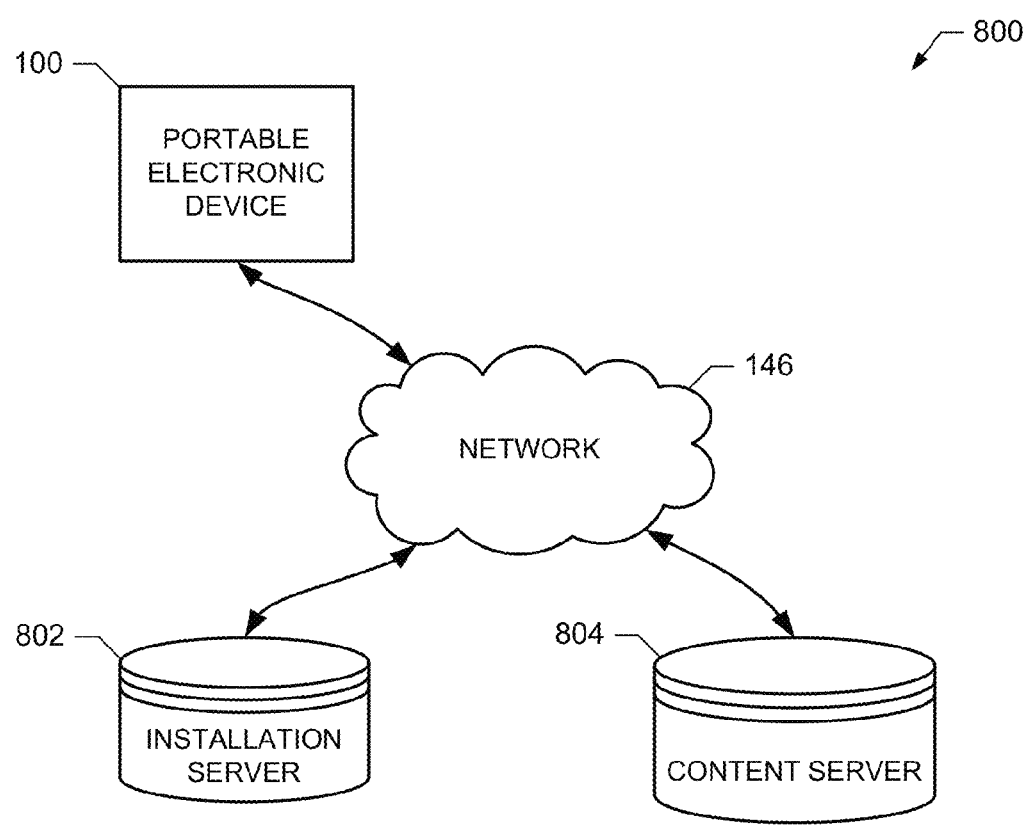
FIG. 8 is a block diagram of an example system to update a live icon installed in the portable electronic device of FIG. 1.

FIG. 8 is a block diagram of an example system 800 to update a live icon installed in the portable electronic device 100 of FIG. 1. The example system 800 is communicatively coupled to the portable electronic device 100 via the network 146, and includes an installation server 802 and a content server 804.

The example installation server 802 stores a live icon package that may be installed on portable electronic devices. The installation server 802 provides a live icon package including a live icon configuration file 224, content file 226, and/or a background image file 228 to the example portable electronic device 100. In some examples, the installation server 802 provides the live icon package in response to a request at the portable electronic device for the live icon package and/or an application package that includes the live icon package. After the installation server 802 transfers the live icon package to the portable electronic device 100, the example live icon subsystem 154 may perform the example communication flow 300 illustrated in FIG. 3 to install the live icon. The example installation server 802 may store and provide more than one live icon to the portable electronic device 100. In some examples, the installation server 802 receives updated versions of the live icon package(s) and provides the updated versions to portable electronic devices for installation and/or updating of previous versions.

The example content server 804 stores content files 226 and/or other web content (e.g., HTML documents, other web documents) and provides the stored content to the portable electronic device 100 upon request. The web content stored on the example content server 804 is updated often to provide the portable electronic device 100 with real-time and/or up-to-date content. When the portable electronic device 100 receives the web content from the content server 804, the live icon subsystem 154 processes the content as disclosed herein to present the content to the user. As a result, the user of the portable electronic device 100 may receive the real-time and/or up-to-date content by viewing the displayed live icons that are updated with content from the content server 804. In some examples, the developer and/or publisher of a live icon maintains one or more content servers 804 specifically designated for providing content to portable electronic devices that have the live icon installed, and are responsible for updating the content. In some other examples, the content server 804 supplies updated content for multiple live icons, and may differentiate between requests by different live icons (e.g., by using different uniform resource indicators for different live icons, etc.).

Figure 9:
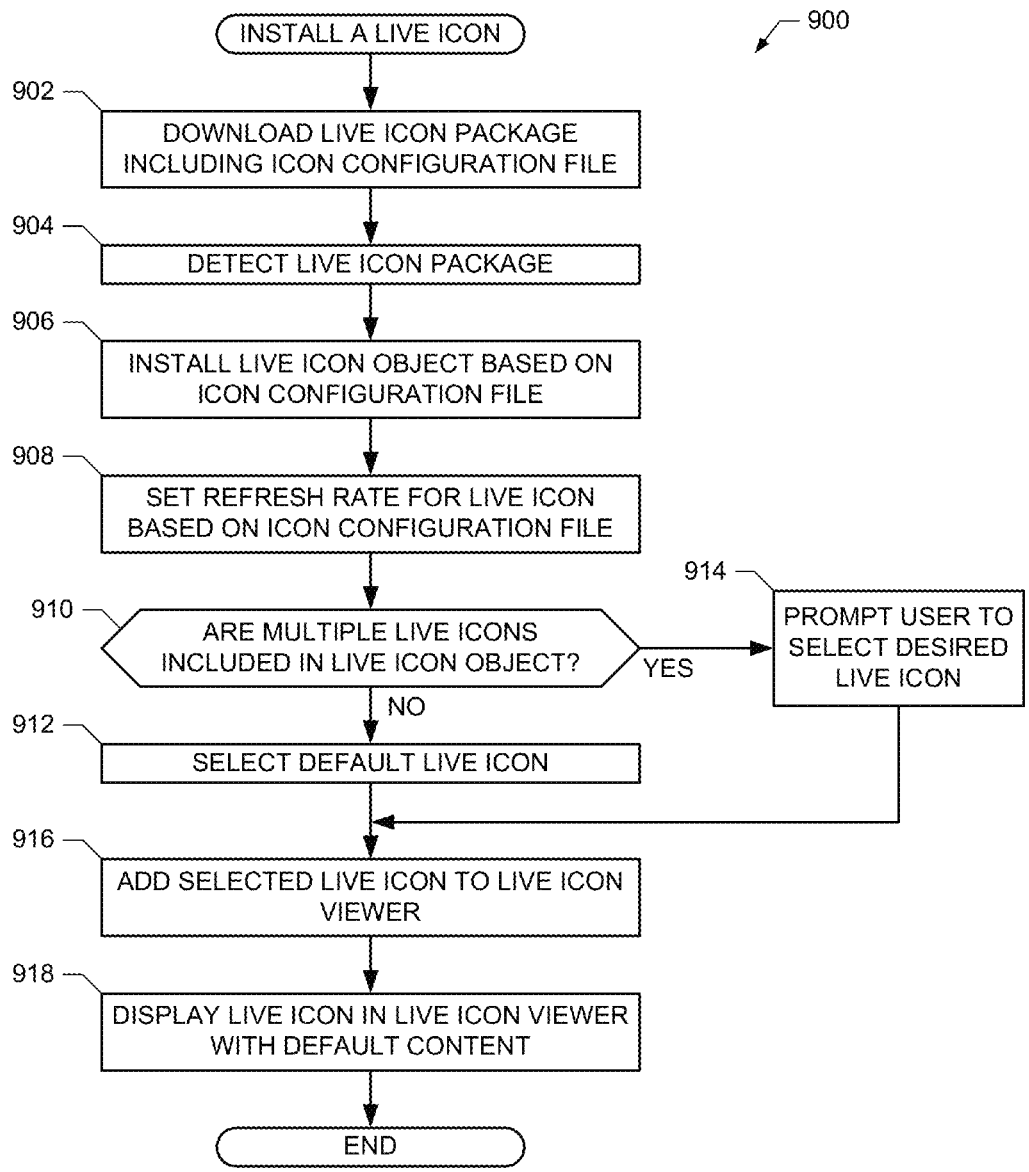
FIG. 9 is a flowchart representative of an example method to install a live icon in a graphic user interface of the example portable electronic device of FIG. 1.

FIG. 9 is a flowchart representative of an example method 900 to install a live icon in a graphic user interface of the example portable electronic device 100 of FIG. 1. The example method 900 may be performed by the example processor 102 and/or the example live icon subsystem 154 of FIG. 1.

To install a live icon, the example processor 102 receives (e.g., via the communication subsystem 104 of FIG. 1) a live icon package including a live icon configuration file 224 (block 902). In some examples, the live icon package is included in an application package. The example live icon configuration file corresponds to the example configuration file schema 500 of FIG. 5 and may be similar in content and/or structure to the example configuration file 600 of FIG. 6.

The example live icon discoverer 202 of FIG. 2 detects the received live icon package (block 904). In some examples, the live icon discoverer 202 and/or the live icon package manager 204 are alerted to the receipt of the live icon package in parallel with block 902. Based on the configuration file 224, the live icon package manager 204 installs a live icon object (block 906). In some examples, the live icon package manager 204 installs the live icon object in the live icon repository 206 of FIG. 2 and notifies the live icon manager 208 that the live icon object is installed.

The example refresh scheduler 212 sets a refresh rate of the live icon based on the configuration file 224 (block 908). In some examples the refresh scheduler 212 sets the refresh rate in response to an indication from the live icon package manager 204 (e.g., via the live icon manager 208). If the refresh rate in the configuration file is a valid refresh value (e.g., greater than 0, within a predetermined range, etc.), the example refresh scheduler 212 schedules one or more refreshes corresponding to the refresh value. On the other hand, if the refresh rate in the configuration file is not a valid refresh value (e.g., is 0 or less, is too large, etc.), the example refresh scheduler 212 assumes that the live icon auto-refreshes and instructs the live icon manager 208 not to refresh the live icon.

The live icon manager 208 also inspects the example configuration file 224 stored in the live icon repository 206 to determine whether multiple live icons are included in the installed live icon object (block 910). For example, some received application packages may include multiple live icons, corresponding to different features of the application, from which the user may choose. If the example live icon object does not include multiple live icons (e.g., only includes one live icon) (block 910), the example live icon manager 208 selects the default live icon (block 912). On the other hand, if the example live icon manager 208 includes multiple live icons (block 910), the example live icon manager 208 prompts the user to select a desired live icon from the included live icons (block 914). In some examples, the live icon manager 208 selects a default live icon (e.g., the first live icon in an ordering of the live icons) and/or provides a method for the user to change his or her selection of one of the multiple live icons.

After selecting a live icon (block 912 or 914), the example live icon manager 208 adds the selected live icon to the live icon viewer 214 (block 916). For example, the live icon manager 208 of FIG. 2 provides the content included in the live icon object stored in the live icon repository 206. Example content includes a background image and default content until the live icon is updated (e.g., from a remote server). The example live icon viewer 214 then displays the live icon with the default content received from the live icon manager 208 (block 918). In some examples, the live icon viewer 214 replaces an icon that was previously displayed in the live icon viewer 214 with the installed live icon. In some other examples, the live icon viewer 214 places the installed live icon in a carousel in a position in which the live icon is not immediately displayed on the display 112 of FIG. 1. The user may scroll through the live icons in the live icon viewer 214 to view the example live icon.

After the live icon viewer 214 displays the example live icon (or allows the user to navigate to the live icon), the example method 900 may end and/or iterate to install an additional live icon.

Figure 10:
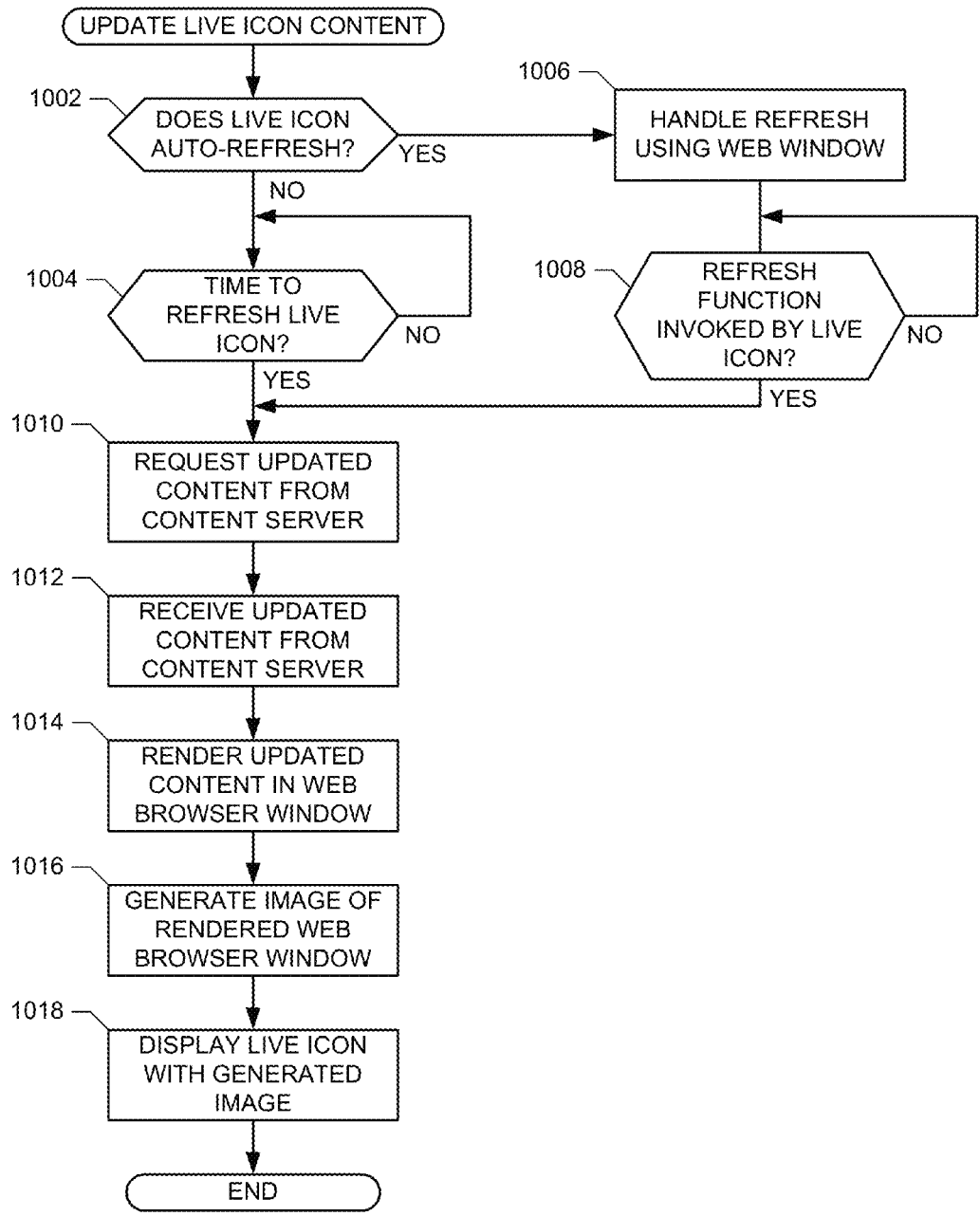
FIG. 10 is a flowchart representative of example method to update a live icon in a graphic user interface of the example portable electronic device of FIG. 1.

FIG. 10 is a flowchart representative of an example method 1000 to update content of a live icon on the example portable electronic device 100 of FIG. 1. In some examples, the method 1000 is implemented The example method 1000 of FIG. 1000 will be described with reference to the example live icon subsystem 154 of FIGS. 1 and 2.

The example method 1000 begins with the web browser manager 220 of FIG. 2 determining whether a live icon auto-refreshes (block 1002). If the example live icon does not auto-refresh (block 1002), the example web browser manager 220 determines whether it is time to refresh the live icon (e.g., based on a refresh rate determined by the refresh scheduler 212 of FIG. 2) (block 1004). If it is not time to refresh the live icon (block 1004), the example web browser manager 220 iterates block 1004 to determine whether it is time to refresh the live icon (e.g., at a time scheduled by the refresh scheduler 212).

If the example live icon auto-refreshes (block 1002), the example web browser manager 220 handles refreshing the live icon using a web window (e.g., the web window associated with the live icon) (block 1006). To handle the refresh using the web window, the example web browser manager 220 performs a refresh of the web window implementing the live icon based on a <refresh> tag and/or a refresh Javascript routine included in the live icon object content file 226. The web browser manager 220 determines whether the live icon has invoked the refresh function (block 1008). If the refresh has not been invoked (block 1008), the example web browser manager 220 iterates block 1008 to determine whether the function has been invoked.

After determining that a scheduled refresh time has occurred (block 1004) or after determining that a auto-refresh function has been invoked (block 1008), the example web browser manager 220 causes the web window associated with the live icon to request updated content from a content server (e.g., the content server 804 of FIG. 8, via the communication subsystem 104 and/or the network 146 of FIGS. 1 and 8) (block 1010). In some examples, the address (e.g., an IP address) and/or location (e.g., a Uniform Resource Locator (URL), a Uniform Resource Identifier (URI)) of the content server 804 are defined by a content file 226 or HTML document that is provided with the live icon at the time of installation. In other examples, the live icon configuration file 224 includes an address and/or location of the content server 804. The example web browser manager 220 receives the updated content from the content server 804 (e.g., via the communication subsystem 104) (block 1012). In some examples, the updated content is provided in the form of an updated content file 226 or other file that includes updates, and includes HTML format and/or Javascript code.

The example web browser manager 220 renders the updated content in the web window corresponding to the live icon (block 1014). In some examples, the web browser manager 220 renders the updated content in the background (e.g., as a background process of the processor 102 of FIG. 1). The image generator 222 generates an image of the rendered updated content (block 1016). The example live icon viewer 214 displays the live icon with the updated image (e.g., an image of the updated content) to the user of the portable electronic device 100 (block 1018). In some examples, the live icon viewer 214 displays the live icon having updated content in the user interface to alert the user to the updated content. In some other examples, the live icon viewer 214 places the live icon having updated content in the carousel for access by the user (e.g., via scrolling through the live icons via the live icon viewer 214).

The example method 1000 may end after displaying the updated live icon. In some examples, however, the method 1000 may iterate for the same and/or additional live icons.

Figure 11:
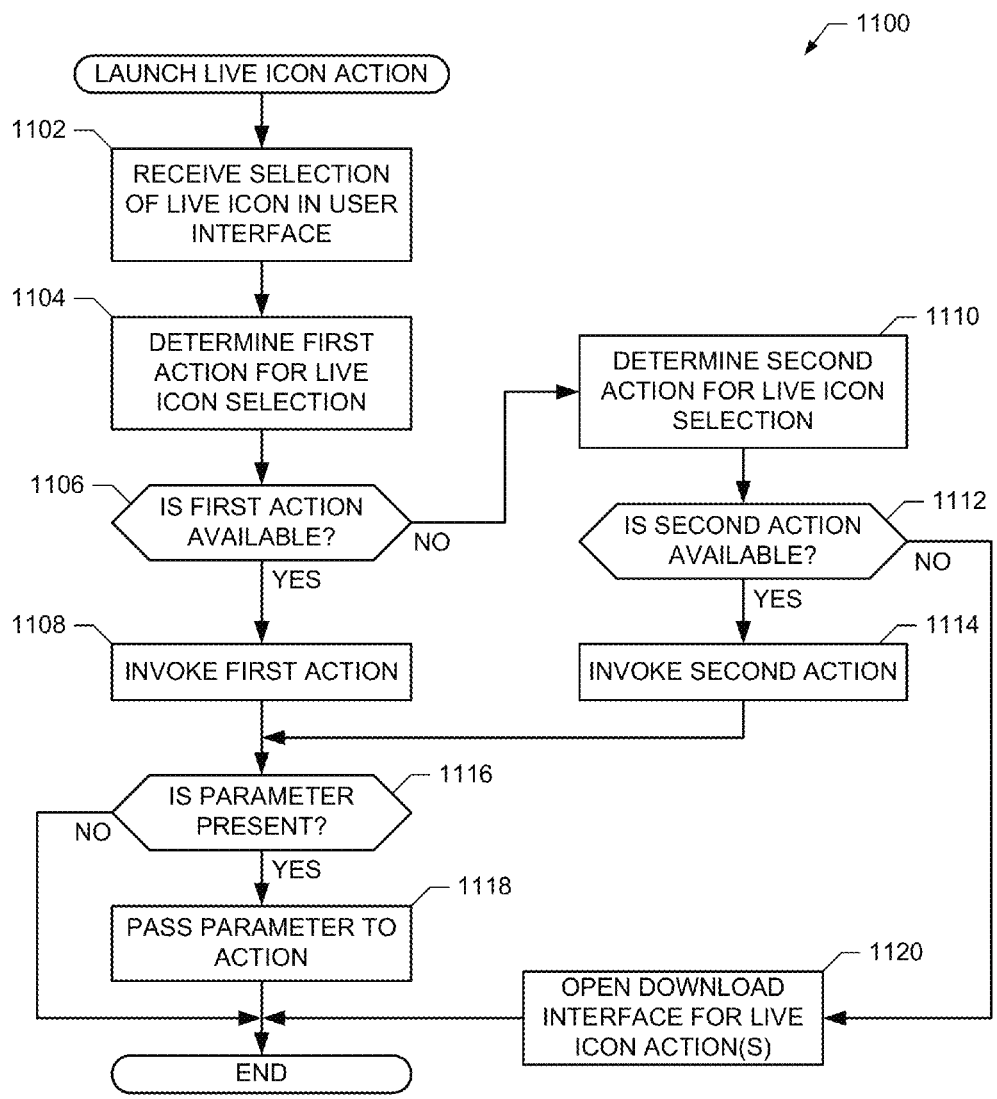
FIG. 11 is a flowchart representative of an example method to launch a service or application in response to a selection of a live icon installed on the example portable electronic device of FIG. 1.

FIG. 11 is a flowchart representative of an example method 1100 to launch an action associated with a live icon. The example method 1100 of FIG. 11 may be implemented by the processor 102 or the live icon subsystem 154 of FIGS. 1 and 2, or both. For example, the live icon manager 208 and/or the live icon viewer 214 of FIG. 2 may be used to implement at least some portions of the method 1100 to perform or launch an action specified by a live icon to present selected content to a user of the portable electronic device 100 of FIG. 1. The discussion below will refer to the example live icon 706 of FIG. 7A to illustrate an example of the method 1100.

The example method 1100 begins with the live icon manager 208 of FIG. 2 receiving a selection of a live icon (e.g., the live icon 706 of FIG. 7A via the live icon viewer 214) (block 1102). Selection of the live icon may occur using any one or combination of inputs to the example portable electronic device 100, such as the example touch-sensitive display 118, the example force sensor 122, the example keypad 124, and/or the example microphone 132.

Based on the selected live icon 706, the live icon manager 208 determines the first action for the live icon 706 (block 1104). For example, the live icon manager 208 of FIG. 2 accesses a live icon object corresponding to the selected live icon 206, which is stored in the live icon repository 206 and/or in the cache 216. In particular, the example live icon manager 208 reads the example live icon configuration file 600 of FIG. 6 to determine a first action (e.g., "VZNavigator"). The live icon manager 208 determines whether the first action (determined from the live icon configuration file 600) is available (block 1106). To determine whether the first action is available, the example live icon manager 208 determines whether the requested action is installed on the portable electronic device 100. In some examples, the live icon manager 208 performs block 1106 when the first action is a non-native (e.g., third-party) application and omits block 1106 when the first action is a native application or an overlay action. If the first action is available (block 1106), the live icon manager 208 invokes the first action (block 1108).

If, on the other hand, the first action is not available (block 1106), the example live icon manager 208 determines a second action for the selected live icon 706 (block 1110). The example live icon manager 208 determines whether the second action is available (block 1112). An example second action may be opening a native web browser application to a web page, displaying an overlay with additional information, etc. If the second action is available (block 1112), the live icon manager 208 invokes the second action (block 1114).

After invoking the first action (block 1108) or the second action (block 1114), the example live icon manager 208 determines whether a parameter is present (block 1116). In some examples, the live icon manager 208 determines (e.g., via the live icon viewer 214) whether the example live icon includes a meta parameter tag (e.g., a <meta name="parameter" content=""/> tag). In some examples, the live icon manager 208 inspects the configuration file 600 associated with the selected live icon (e.g., stored in the live icon repository 206 and/or the cache 216) to determine whether the configuration file includes an action information tag (e.g., <actionInfo>) associated with the invoked action.

If the example live icon includes a parameter (block 1116), the live icon manager 208 passes the parameter to the selected action (block 1118). In some examples, the live icon manager 208 passes the parameter to the action as an argument (e.g., open web browser using web page parameter). In some other examples, the live icon manger 208 stores the parameter in the Runtime Store 218 of FIG. 2, from which the application or overlay associated with the selected action retrieves the parameter.

If the second action is not available (block 1112), the example live icon manager 208 opens a download interface for receiving the live icon action(s) (block 1120). For example, opening the download interface may include opening a web page in a web browser application, from which the portable electronic device 100 may receive applications corresponding to the first and/or second actions of the selected live icon. After opening the download interface (block 1120) (and potentially receiving and installing one or more applications), after passing the parameter to an invoked action (block 1118), and/or if a parameter is not available for an invoked action (block 1116), the example method 1100 may end. In some examples, the method 1100 iterates to respond to a selection of another live icon via the example live icon viewer 214.

Figure 12:
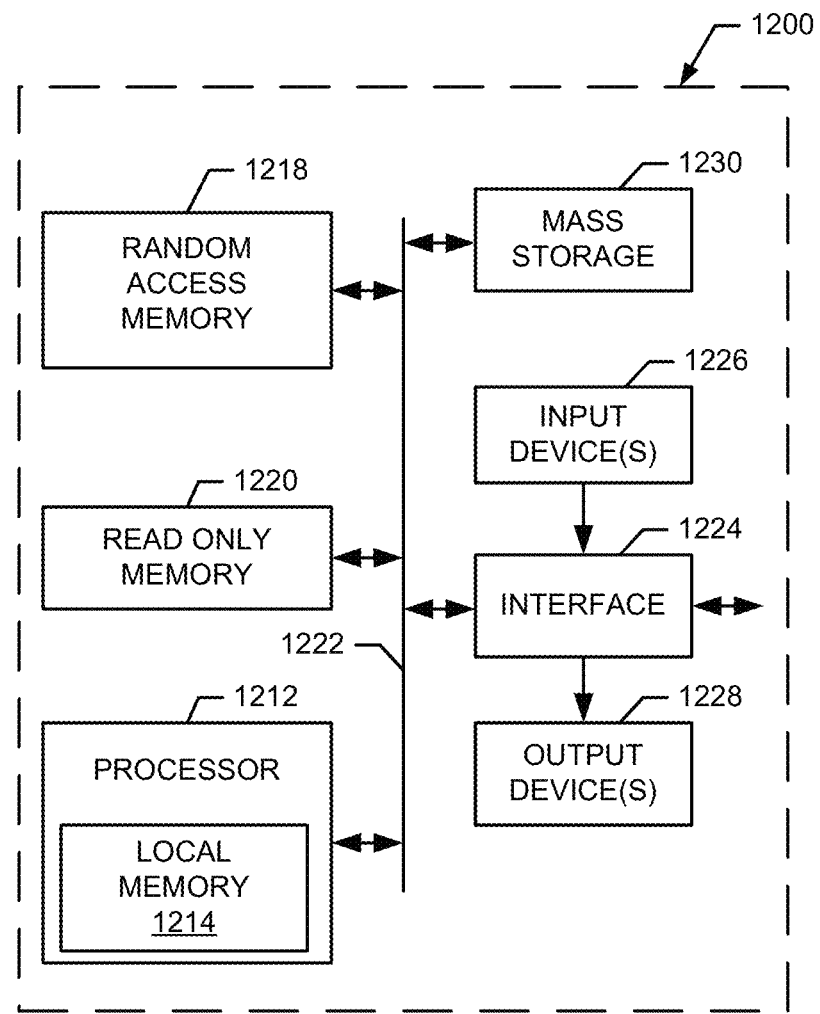
FIG. 12 is a block diagram of an example processing system capable of implementing the apparatus and methods disclosed herein.

FIG. 12 is a block diagram of an example processing system 1200 capable of implementing the apparatus and methods disclosed herein. The processing system 1200 can correspond to, for example, a portable electronic device, an access control system, or any other type of computing device.

The system 1200 of the instant example includes a processor 1212 such as a general purpose programmable processor, an embedded processor, a microcontroller, etc. The processor 1212 includes a local memory 1214, and executes coded instructions 1216 present in the local memory 1214 and/or in another memory device. The processor 1212 may execute, among other things, machine readable instructions to implement the example servers 802 and 804 of FIG. 8 to provide a user interface for a portable electronic device. The processor 1212 may be any type of processing unit, such as one or more microprocessors, one or more microcontrollers, etc. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The system 1200 also includes an interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 (e.g., the display 112) are also connected to the interface circuit 1224. The output devices 1228 can be implemented, for example, by display devices (e.g., a liquid crystal display).

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 1200 also includes one or more mass storage devices 1230 for storing software and data. Examples of such mass storage devices 1230 include Secure Digital (SD) cards, microSD cards, flash storage, or any suitable memory.

As an alternative to implementing the methods and/or apparatus described herein in a system such as shown in FIG. 12, the methods and or apparatus described herein may be embedded in a structure such as a processor and/or an ASIC (application specific integrated circuit).

The methods described herein may be carried out by software executed, for example, by the processor 102. Coding of software for carrying out such a method is within the scope of a person of ordinary skill in the art given the present description. A computer-readable medium having computer-readable code may be executed by at least one processor of the portable electronic device 100 to perform the methods described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for providing a user interface, the method comprising:
   receiving an icon object, wherein the icon object comprises an icon configuration file, a default content, and a background image file, wherein the icon configuration file comprises configuration information including a refresh rate and a context for displaying an icon associated with the icon configuration file, the icon defined by a HyperText Markup Language (HTML) or script code;
   installing the icon associated with the icon configuration file in an icon repository on a portable electronic device, wherein installing the icon includes storing the background image file in the icon repository on the portable electronic device;
   determining, by the portable electronic device, context information associated with the portable electronic device;
   determining whether the context information associated with the portable electronic device matches the context in the configuration information of the icon configuration file;
   in response to determining that the context information associated with the portable electronic device matches the context in the icon configuration file:
      displaying the icon with a first icon image, wherein the displayed icon represents a website and is associated with a web browser object in a user interface on the portable electronic device, and wherein the first icon image is generated at least in part by:
         rendering the default content and the background image file in the web browser object in the user interface on the portable electronic device; and
         presenting an image of at least part of the rendered first web browser object on the portable electronic device;
   determining the refresh rate in the icon configuration file has a value less than zero;
   in response to the refresh rate having a value less than zero, determining a value of a parameter in the HTML or script code defining the icon and performing an auto-refresh to receive a second content, the auto-refresh is performed based on the determined parameter value in the HTML or script code defining the icon;
   receiving the second content;
   and
   in response to receiving the second content, replacing the displayed first icon image with a second icon image, wherein the second icon image is generated at least in part by:
   rendering the received second content and the stored background image file in the web browser object in the user interface on the portable electronic device; and
      presenting an image of at least part of the rendered second web browser object on the portable electronic device.

2. The method of claim 1, wherein the icon configuration file further comprises at least one of: a location of the second content, a first action associated with selection of the icon, a second action associated with selection of the icon, an action parameter, or a display view.

3. The method of claim 2, wherein the first action comprises at least one of displaying an application native to the portable electronic device in the user interface or displaying an application received at the portable electronic device and associated with the icon in the user interface.

4. The method of claim 3, wherein the first action further comprises passing a parameter to an application associated with the first action.

5. The method of claim 4, further comprising extracting the parameter from the second content.

6. The method of claim 4, further comprising opening the application associated with the first action based on the parameter from the second content.

7. The method of claim 1, further comprising prompting a user to select between a plurality of icons, wherein displaying the icon is based on a user selection.

8. The method of claim 1, wherein the context information comprises at least one of a local time of the portable electronic device, an event stored on the portable electronic device, a location of the portable electronic device, or a user preference of the portable electronic device.

9. The method of claim 1, wherein receiving the second content comprises receiving a document comprising at least one of hypertext markup language, extensible markup language code, a cascading style sheet, or an image.

10. The method of claim 1, wherein displaying the icon with the second icon image is in response to a trigger event associated with the icon.

11. The method of claim 1, further comprising refreshing the web browser object based on the icon configuration file to render the second content.

12. The method of claim 1, further comprising determining whether a first action is enabled, wherein the icon configuration file comprises at least the first action to be performed when the first action is enabled associated with a selection of the icon and a second action to be performed when the first action is not enabled on the portable electronic device.

13. The method of claim 1, wherein the web browser object is executed on the portable electronic device.

14. An apparatus to provide a user interface, comprising:
   a live icon package manager configured to install a live icon, wherein the live icon is associated with an icon configuration file, the icon configuration file including a refresh rate and a context for displaying the live icon, the live icon defined by a HyperText Markup Language (HTML) or script code;
   a live icon viewer configured to provide the user interface including the live icon displaying a first icon image, wherein the first icon image is generated at least in part by rendering default content and a background image file associated with the live icon in the web browser object in the user interface on the apparatus, the background image file stored in a live icon repository on the apparatus, capturing an image of at least part of the rendered first web browser object, and presenting the image of at least part of the rendered first web browser object on the apparatus, and providing the user interface including the live icon displaying a second icon image replacing the first icon image, wherein the second icon image is generated at least in part by rendering second content and the stored background image file associated with the live icon in the web browser object in the user interface on the apparatus, capturing an image of at least part of the rendered second web browser object, and presenting the image of at least part of the rendered second web browser object on the apparatus, and wherein the second content is updated content of the default content, and the second content is received by:

or
  determining the refresh rate in the icon configuration file has a value less than zero;
  in response to the refresh rate having a value less than zero determining a value of a parameter in the HTML or script code defining the icon and performing an auto-refresh based on the determined parameter value in the HTML or script code defining the live icon;
a web browser manager configured to refresh the web browser object to update the live icon to display the second icon image replacing the first icon image; and
a live icon manager configured to:
  determine context information associated with the apparatus;
  determine whether the context information associated with the apparatus matches the context in the icon configuration file; and
  in response to determining that the context information associated with the apparatus matches the context in the icon configuration file, provide the live icon from the live icon repository to the live icon viewer and to initiate an action in response to a selection of the live icon in the live icon viewer.

15. The apparatus of claim 14, wherein the live icon manager is configured to initiate the action based on an icon object, wherein the icon object comprises the icon configuration file, the default content, and the background image file.

16. The apparatus of claim 14, wherein the live icon package manager is configured to install the live icon based on the icon configuration file, the icon configuration file further comprising at least one of a location of the second content, a first action associated with selection of the live icon, a second action associated with selection of the live icon, an action parameter, or a display view.

17. The apparatus of claim 14, wherein the live icon comprises at least one of a background image or a web document.

18. The apparatus of claim 17, wherein the web browser manager is configured to generate the web browser object to be associated with the live icon.

19. The apparatus of claim 18, further comprising an image generator configured to generate an image of the live icon as rendered, wherein the live icon viewer is to display the image of the live icon.

20. The apparatus of claim 14, further comprising a view filter configured to determine a live icon to be displayed by the live icon viewer based on contextual information available to the view filter.

21. The apparatus of claim 14, further comprising a live icon discoverer configured to detect a received live icon package including the live icon.

22. A system to provide a user interface, comprising:
an installation server comprising a first processor configured to provide to a portable electronic device a live icon package including at least an icon object, wherein the icon object comprises an icon configuration file, a default content, and a background image file, the background image file being stored on the portable electronic device wherein the icon configuration file comprises configuration information including a refresh rate and a context for displaying a live icon associated with the icon configuration file, the live icon defined by a HyperText Markup Language (HTML) or script code;
a content server comprising a second processor configured to:
provide to the portable electronic device the default content to be rendered with the stored background image file in a web browser object in the user interface on the portable electronic device, wherein an image of at least part of the rendered first web browser object is presented on the portable electronic device as a first icon image associated with the live icon and the live icon is installed from the live icon package provided to the portable electronic device for display on the live icon, wherein the live icon represents a website and is associated with the web browser object in the user interface on the portable electronic device;
receive a request for updated content of the default content from the portable electronic device, wherein the request is received based on the refresh rate in the icon configuration file, and the request is received through the portable electronic device performing:
  determining the refresh rate in the icon configuration file has a value less than zero;
  in response to the refresh rate having a value less than zero, the portable electronic device determining a value of a parameter in the HTML or script code defining the icon and performing an auto-refresh based on the determined a-parameter value in the HTML or script code defining the live icon; and
in response to receiving the request, provide second content to the portable electronic device to be rendered with the stored background image file in the web browser object in the user interface on the portable electronic device, wherein an image of at least part of the rendered second web browser object is presented on the portable electronic device as a second icon image to replace the first icon image on the live icon, and wherein the second content is the updated content of the default content; and
the portable electronic device comprising a third processor configured to:
determine context information associated with the portable electronic device;
determine whether the context information associated with the portable electronic device matches the context in the configuration information of the icon configuration file; and
in response to determining that the context information associated with the portable electronic device matches the context in the icon configuration file, send the request for updated content to the content server.

23. The system of claim 22, wherein the icon configuration file further comprises at least one of, an action to be taken in response to selection of the live icon, or a user interface view with which the live icon is to be associated on the portable electronic device.

* * * * *